United States Patent
Vogelsgesang et al.

(10) Patent No.: US 10,795,888 B2
(45) Date of Patent: Oct. 6, 2020

(54) ELIMINATION OF QUERY FRAGMENT DUPLICATION IN COMPLEX DATABASE QUERIES

(71) Applicant: Tableau Software, Inc., Seattle, WA (US)

(72) Inventors: Adrian Vogelsgesang, Munich (DE); Michael Haubenschild, Munich (DE); Richard L. Cole, Palo Alto, CA (US); Jan Finis, Munich (DE); Manuel Then, Munich (DE); Tobias Muehlbauer, Munich (DE); Thomas Neumann, Munich (DE)

(73) Assignee: Tableau Software, Inc., Seattle, WA (US)

( * ) Notice: Subject to any disclaimer, the term of this patent is extended or adjusted under 35 U.S.C. 154(b) by 122 days.

(21) Appl. No.: 16/231,302

(22) Filed: Dec. 21, 2018

(65) Prior Publication Data

US 2020/0201860 A1    Jun. 25, 2020

(51) Int. Cl.
*G06F 16/2453*    (2019.01)

(52) U.S. Cl.
CPC .. *G06F 16/24542* (2019.01); *G06F 16/24537* (2019.01)

(58) Field of Classification Search
CPC .................... G06F 16/24542; G06F 16/24537
USPC ........................................................ 707/718
See application file for complete search history.

(56) References Cited

U.S. PATENT DOCUMENTS

| | | | |
|---|---|---|---|
| 5,379,422 A | 1/1995 | Antoshenov | |
| 6,275,818 B1 * | 8/2001 | Subramanian | ...... G06F 16/2454 |
| 7,574,424 B2 * | 8/2009 | Chowdhuri | ....... G06F 16/24532 |
| 8,239,847 B2 * | 8/2012 | Yu | ........................... G06F 8/456 712/200 |
| 8,898,145 B2 * | 11/2014 | Wang | .................. G06F 16/2456 707/714 |
| 9,773,041 B2 * | 9/2017 | Cruanes | ............ G06F 16/24542 |
| 2009/0228414 A1 | 9/2009 | Dumeur et al. | |

(Continued)

OTHER PUBLICATIONS

Lehner, Wolfgang, et al., Web-Scale Data Management for the Cloud, "Chapter 4: Web-Scale Analytics for Big Data", Springer Science+Business Media, New York, NY, © 2013, pp. 91-135.*

(Continued)

*Primary Examiner* — Robert Stevens
(74) *Attorney, Agent, or Firm* — Morgan, Lewis & Bockius LLP

(57) ABSTRACT

A database engine receives a database query from a client. The database engine parses the database query to build a query operator tree that includes a plurality of query operators. The database engine performs one or more optimization passes on the query operator tree, including a deduplication optimization pass, to form an optimized execution plan. The deduplication optimization pass includes: creating a list of query operators via a first traversal of the query operator tree, determining a first query operator that is equivalent to a second query operator, based on a hash map, via a second traversal of the query operator tree, and substituting, via a third traversal of the query operator tree, the second query operator with a tree node that links to the first query operator. The database engine executes the optimized execution plan to retrieve a result set from the database, and returns the result set.

20 Claims, 23 Drawing Sheets

(56) References Cited

U.S. PATENT DOCUMENTS

| | | |
|---|---|---|
| 2010/0191720 A1 | 7/2010 | Al-Omari |
| 2011/0137890 A1 | 6/2011 | Bestgen et al. |
| 2011/0313999 A1 | 12/2011 | Bruno et al. |
| 2012/0136850 A1 | 5/2012 | Barsness et al. |
| 2013/0091122 A1 | 4/2013 | Salch et al. |
| 2014/0095472 A1 | 4/2014 | Lee et al. |
| 2016/0350371 A1 | 12/2016 | Das et al. |
| 2017/0031975 A1 | 2/2017 | Mishra et al. |
| 2018/0024922 A1 | 1/2018 | Hassan |
| 2018/0089268 A1* | 3/2018 | Lee .................. G06F 16/24542 |
| 2018/0121426 A1 | 5/2018 | Barsness et al. |
| 2018/0314733 A1* | 11/2018 | Wen .................. G06F 16/24542 |

OTHER PUBLICATIONS

Newmann, U.S. Appl. No. 15/706,587, Preinterview First Office Action, dated Oct. 31, 2019, 6 pgs.

Newmann, U.S. Appl. No. 15/706,587, First Action, Interview Office Action, dated Dec. 16, 2019, 5 pgs.

Newmann, U.S. Appl. No. 15/706,587, Notice of Allowance, U.S. Appl. No. 15/706,587, dated Feb. 12, 2020, 8 pgs.

Schreier, Preinterview First Office Action, U.S. Appl. No. 15/650,658, dated Apr. 29, 2019, 4 pgs.

Schreier, First Action Interview Office Action, U.S. Appl. No. 15/650,658, dated Jun. 27, 2019, 4 pgs.

Schreier, Notice of Allowance, U.S. Appl. No. 15/650,658, dated Oct. 10, 2019, 10 pgs.

Schreier, Preinterview First Office Action, U.S. Appl. No. 15/681,294, dated Mar. 6, 2020, 4 pgs.

Schreier, First Action, Interview Office Action, U.S. Appl. No. 15/681,294, dated Mar. 31, 2020, 4 pgs.

* cited by examiner

B

536 — Compute a list of dependencies among the query operators in the list of query operators. The second traversal is a a breadth-first post-order traversal of the query operator tree based on the list of dependencies such that query operators that do not have dependencies are visited before query operators with dependencies.

538 — When a third query operator has no equivalent query operators, update the list of dependencies to indicate that the third query operator has dependencies so that the parent of the third query operator is not selected during the breadth-first post-order traversal.

540 — Determine if the input operators of the first query operator and the second query operator are equivalent.

542 — Take into consideration commutativity, associativity, and similar algebraic properties of query operators.

544 — Determine if the first query operator and the second query operator have equivalent properties.

546 — Determine if the first query operator and the second query operator have equivalent properties based at least on an information unit mapping of the respective input operators of the first query operator and the second query operator.

Figure 5D

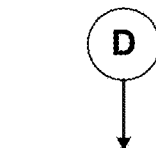

548 — Replace the second operator with the tree node only when the first query operator can be materialized.

550 — The first query operator is one of: a GroupBy operator, a GroupJoin operator, a Sort operator, a Window operator, or a Temp operator.

Figure 5E

552 — The tree node that links to the first query operator reduces the number of execution instances of a portion of the optimized execution plan corresponding to the second query operator.

Figure 5F

```
map<signature, vector<Operator*>> indexedOperators;
EstablishedEquivalences equivalences;
BFSTraversal traversal(rootNode);
traversal.visit([](auto& op) {
  uint64_t signature = op.getSignature();
  for (auto& candidate : indexedOperators[signature]) {
    if (auto m = op.establishEqMapping(candidate, equivalences)) {
      equivalences.add({op, candidate, m});
      traversal.unblockDependency(&op);
      traversal.unblockDependency(candidate);
      return;
    }
  }
  indexedOperators[signature].insert(&op);
});
```

Figure 6

ELIMINATION OF QUERY FRAGMENT DUPLICATION IN COMPLEX DATABASE QUERIES

CROSS REFERENCE TO RELATED APPLICATIONS

This application is related to U.S. patent application Ser. No. 15/700,023, filed Sep. 8, 2017, U.S. patent application Ser. No. 15/706,587, filed Sep. 15, 2017, U.S. patent application Ser. No. 15/885,677, filed Jan. 31, 2018, and U.S. patent application Ser. No. 15/650,658, filed Jul. 14, 2017, each of which is incorporated by reference herein in its entirety.

TECHNICAL FIELD

The disclosed implementations relate generally to relational database systems, and more specifically to system features that improve query execution performance.

BACKGROUND

A database engine receives queries, and retrieves data from one or more database tables to provide the data requested by the query. A database query is expressed in a specific query language, such as SQL. In general, a database query specifies the desired data without specifying a detailed execution plan about how to retrieve the data. For example, in SQL, the query includes a SELECT clause, a FROM clause, and a WHERE clause, which specify the data columns desired, the tables that include the desired columns, and conditions on how the data is selected. SQL queries may also contain a GROUP By clause, a HAVING clause, and/or an ORDER BY clause. It is up to the database engine to parse each query, build an execution plan, and execute the plan to retrieve the requested results. This gives the database engine substantial flexibility. However, different execution plans for the same query can have enormously different execution times to retrieve the results. For example, one execution plan may retrieve the results in less than a second, whereas a second plan may take minutes to retrieve exactly the same results. To address this issue, database engines typically include one or more optimization layers to improve execution performance. Unfortunately, existing database engines have difficulty optimizing certain types of complex queries.

SUMMARY

When an SQL query is received by a database engine, the query is parsed and translated into an abstract syntax tree. Semantic analysis turns the syntax tree into an operator tree. Building the operator tree combines the syntax tree with schema information, resolves table and column names, and resolves internal references within the query. During logical optimization, the database engine applies constant folding, predicate pushdown, and join reordering, as well as other optimization techniques. The database engine described herein is able to remove duplicate subqueries, and thereby avoids executing redundant query operations.

A method is provided for enhancing real-time data exploration through elimination of duplicate query fragments in complex database queries. In accordance with some implementations, the method is performed at a database engine having one or more computing devices, each having one or more processors and memory. The memory stores one or more programs configured for execution by the one or more processors. The one or more programs execute to retrieve data from a database (e.g., an SQL database). The database engine receives a database query from a client. The database engine parses the database query to build a query operator tree that includes a plurality of query operators. The database engine performs one or more optimization passes on the query operator tree, including a deduplication optimization pass, to form an optimized execution plan. The deduplication optimization pass includes (i) creating a list of query operators via a first traversal of the query operator tree, (ii) determining that a first query operator is equivalent to a second query operator, based on a hash map, via a second traversal of the query operator tree, and (iii) replacing, via a third traversal of the query operator tree, the second query operator with a tree node that links to the first query operator. The database engine executes the optimized execution plan to retrieve a result set from the database, and returns the result set to the client.

In some implementations, the database engine computes a list of dependencies among the query operators in the list of query operators. The second traversal is a breadth-first post-order traversal of the query operator tree based on the list of dependencies so that query operators that do not have dependencies are visited before query operators with dependencies. In some implementations, when a third query operator has no equivalent query operators, the list of dependencies is updated to specify that the third query operator has dependencies so that the parent of the third query operator is not selected during the breadth-first post-order traversal.

In some implementations, the database engine replaces the second query operator with the tree node only when the first query operator can be materialized. For example, the database engine employs the heuristic that re-computation (or re-materialization) may be better than storing and retrieving a previously computed result because the concerned query operator (e.g., a join operator) produces a large result and storing and retrieving the large result would lead to memory and/or bandwidth related performance issues. In some implementations, the database engine replaces the second query operator when the first query operator is either a GROUPBy operator, a GROUPJOIN operator, a SORT operator, a WINDOW operator, or a TEMP operator.

In some implementations, the tree node that the database engine uses to link to the first query operator reduces the number of execution instances of a portion of the optimized execution plan corresponding to the second query operator.

In some implementations, the first traversal and the third traversal of the query operator are depth-first pre-order traversals of the query operator tree.

In some implementations, the database engine performs a tree refactoring optimization pass before the deduplication optimization pass to refactor the query operator tree. This increases the number of duplicate query operators in the query operator tree. In other words, the refactoring increases opportunities for the deduplication optimization pass to remove duplicate or redundant query operators. In some implementations, the database engine turns off, suppresses, or does not run one or more optimization passes preceding the deduplication optimization pass that would inhibit the deduplication optimization pass (e.g., passes that would decrease the number of duplicate query operators in the query operator tree, reduce opportunities, or make finding duplicates difficult).

In some implementations, the database engine determines if the first query operator is equivalent to the second query operator based on determining if the input operators of the first query operator and the second query operator are equivalent, and/or determining if the first query operator and the second query operator have equivalent properties (e.g., the operators are selection predicates, join conditions, or scanned tables). In some implementations, the database engine determines that the first query operator and the second query operator have equivalent properties based on information unit mapping (sometimes called IUMapping) of the input operators of the first query operator and the second query operator. In some implementations, the database engine takes into consideration commutativity, associativity, and similar algebraic properties of query operators in determining whether the first query operator is equivalent to the second query operator. While doing so, the database engine ignores minor differences between the algebraic representations of the first query operator and the second query operator. In some implementations, while determining if the first query operator is equivalent to the second query operator, the database engine ignores one or more non-matching query operators (sometimes called "transparent" operators) in the sub-trees corresponding to the first query operator and the second query operator.

In some implementations, the hash map is indexed by query operator signatures. In some implementations, the hash map is updated as query operators are visited during the second traversal of the query operator tree.

In some implementations, the database engine merges query fragments by constructing a fourth query operator that subsumes the first query operator and the second query operator, and/or replacing, via the third traversal of the query operator tree, the first query operator and the second query operator with the fourth query operator.

In some implementations, the database engine optimizes aggregation hierarchies in query operator trees by constructing a fifth query operator that subsumes the first query operator and the second query operator, constructing a sixth query operator that uses the result of the fifth query operator as an input, and/or replacing, via the third traversal of the query operator tree, the first query operator with the fifth query operator, and the second query operator with the sixth query operator.

In some implementations, the database engine removes redundant joins. For example, in accordance with a determination that the first query operator and the second query operator are input operators of a parent join query operator, the database engine removes the parent join query operator in the query operator tree and replaces it with the first query operator, and deletes the second query operator from the query operator tree.

In some implementations, the database engine recycles and/or caches intermediate results of execution by caching a first result of executing the first query operator using a caching mechanism. For example, the database engine uses a LRU or a similar scheme that maximizes cache hit rate. In some implementations, the database engine uses a persistent cache (e.g., for packed workbooks) so that future loads or first impressions are fast.

In some implementations, the database engine removes duplicate query operations across batch queries. The first query operator and the second query operator belong to different queries within a query batch, and the query operator tree includes one or more query operators (e.g., a UNIONALL operator) that combine different queries within the query batch.

In accordance with some implementations, a database engine includes one or more processors, memory, and one or more programs stored in the memory. The programs are configured for execution by the one or more processors. The programs include instructions for performing any of the methods described herein.

In accordance with some implementations, a non-transitory computer readable storage medium stores one or more programs configured for execution by a computer system having one or more processors and memory. The one or more programs include instructions for performing any of the methods described herein.

Thus methods, systems, and computer readable media are disclosed that provide more efficient processing by removal or elimination of query fragment duplicates in complex database queries.

Both the foregoing general description and the following detailed description are exemplary and explanatory and are intended to provide further explanation of the invention as claimed.

BRIEF DESCRIPTION OF THE DRAWINGS

For a better understanding of the aforementioned systems and methods that provide efficient database query processing, reference should be made to the Description of Implementations below, in conjunction with the following drawings in which like reference numerals refer to corresponding parts throughout the figures.

FIGS. 5A-5I provide a flowchart of a process for building, optimizing, and executing query operator trees according to some implementations.

FIG. 6 provides pseudocode for a hash-based deduplication process, in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
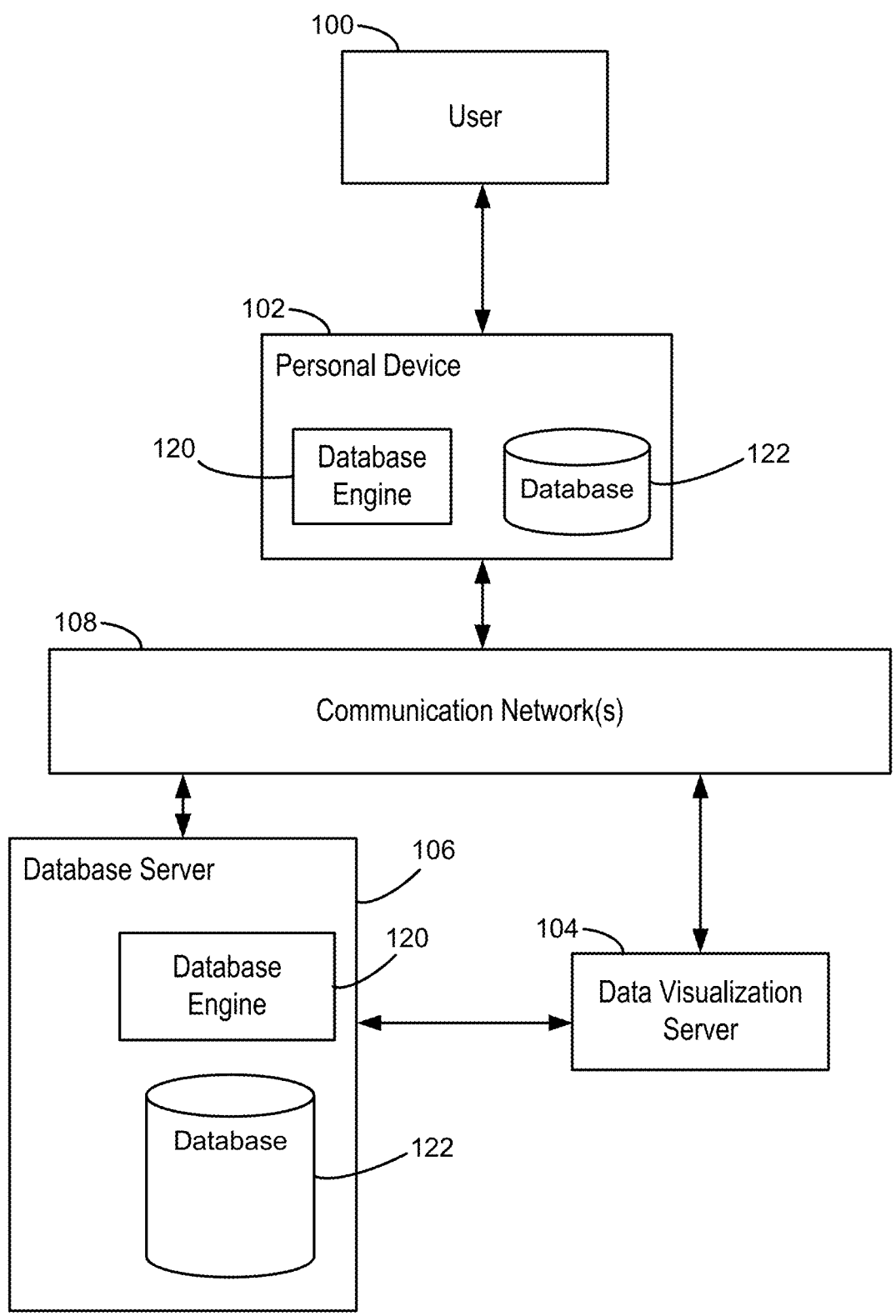
FIG. 1 illustrates the context for a database system in accordance with some implementations.

FIG. 1 illustrates a context in which some implementations operate. A user 100 interacts with a personal device 102, such as a desktop computer, a laptop computer, a tablet computer, or a mobile computing device. A personal device 102 is an example of a computing device 200. The term "computing device" also includes server computers, which may be significantly more powerful than a personal device used by a single user, and are generally accessed by a user only indirectly. An example computing device 200 is described below with respect to FIG. 2, including various software programs or modules that execute on the device

200. In some implementations, the personal device 102 includes one or more desktop data sources 224 (e.g., CSV files or spreadsheet files). In some implementations, the personal device 102 includes a database engine 120, which provides access to one or more relational databases 122 (e.g., SQL databases). In some implementations, the personal device includes a data visualization application 222, which the user 100 uses to create data visualizations from the desktop data sources 224 and/or the relational databases 122. In this way, some implementations enable a user to visualize data that is stored locally on the personal device 102.

In some cases, the personal device 102 connects over one or more communications networks 108 to one or more external database servers 106 and/or a data visualization server 104. The communication networks 108 may include local area networks and/or wide area networks, such as the Internet. In some implementations, the data visualization server 104 provides a data visualization web application that runs within a web browser 220 on the personal device 102. In some implementations, data visualization functionality is provided by both a local application 222 and certain functions provided by the data visualization server 104. For example, the data visualization server 104 may be used for resource intensive operations. In some implementations, the one or more database servers 106 include a database engine 120, which provides access to one or more databases 122 that are stored at the database server 106. As illustrated in FIG. 1, a database engine 120 and corresponding databases 122 may reside on either a local personal device 102 or on a database server 106. In some implementations (not illustrated here), the data visualization server 104 includes a database engine 120 and one or more databases 122.

Figure 2:
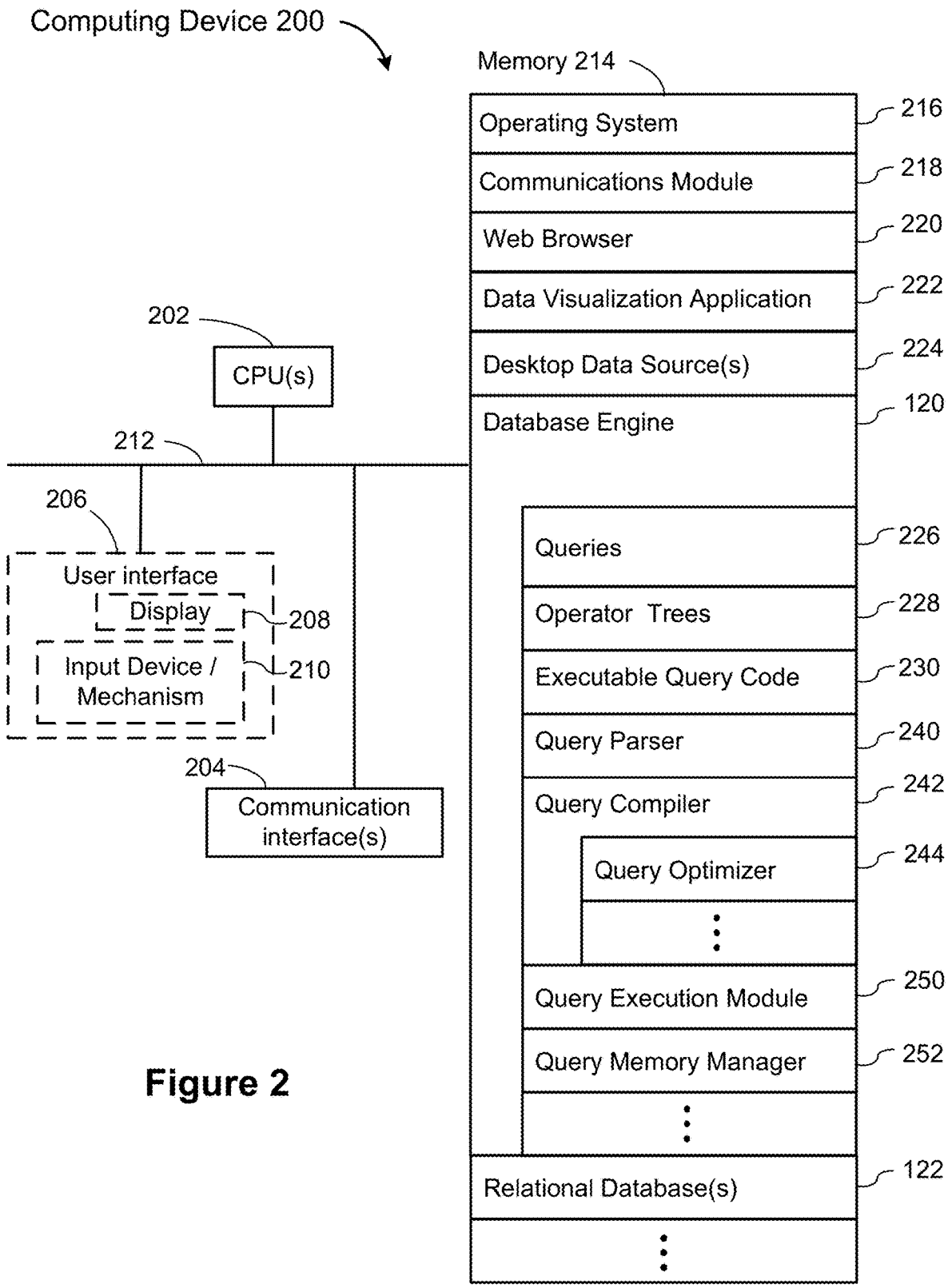
FIG. 2 is a block diagram of a computing device according to some implementations.

FIG. 2 is a block diagram illustrating a computing device 200 in accordance with some implementations. As used herein, the term "computing device" includes both personal devices 102 and servers, such as a database server 106 or a data visualization server 104. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 may include a user interface 206 comprising a display device 208 and one or more input devices or mechanisms 210. In some implementations, the input device/mechanism 210 includes a keyboard. In some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display). In some implementations, the memory 214 includes high-speed random-access memory, such as DRAM, SRAM, DDR RAM, or other random access solid state memory devices. In some implementations, the memory 214 includes non-volatile memory, such as one or more magnetic disk storage devices, optical disk storage devices, flash memory devices, or other non-volatile solid-state storage devices. In some implementations, the memory 214 includes one or more storage devices remotely located from the CPU(s) 202. The memory 214, or alternatively the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks 108, such as the Internet, other wide area networks, local area networks, metropolitan area networks, and so on;
- a web browser 220 (or other client application), which enables a user 100 to communicate over a network with remote computers or devices. In some implementations, the web browser 220 executes a data visualization web application (not shown) downloaded from a data visualization server 104. In some implementations, a data visualization web application (not shown) is an alternative to storing a data visualization application 222 locally;
- a data visualization application 222, which enables users to construct data visualizations from various data sources. The data visualization application 222 retrieves data from one or more data sources, such as a desktop data source 224 (e.g., a CSV file or flat file), a relational database 122 stored locally, or a desktop data source or relational database 122 stored on another device (such as a database server 106). The data visualization application then generates and displays the retrieved information in one or more data visualizations;
- one or more desktop data sources 224, which have data that may be used and displayed by the data visualization application 222. Data sources 224 can be formatted in many different ways, such as spreadsheets, XML files, flat files, CSV files, text files, JSON files, or desktop database files. Typically, the desktop data sources 224 are used by other applications as well (e.g., a spreadsheet application);
- a database engine 120, which receives database queries 226 (e.g., a query from a data visualization application) and returns corresponding data. The database engine 120 typically includes a plurality of executable modules;
- the database engine 120 invokes a query parser 240, which parses each received query 226 (e.g., SQL database query) to form a query operator tree 228. An operator tree is sometimes referred to as an algebra tree. In some implementations, the query parser 240 is contained within the query compiler 242;
- the database engine 120 includes a query compiler 242, which translates each query operator tree 228 into executable code 230. For brevity, the query compiler 242 is also referred to as the compiler. In some implementations, the compiler 242 includes an optimizer 244, which modifies a query operator tree 228 to produce an efficient execution plan. The optimizer is generally capable of identifying multiple types of optimization based on the structure of the query operator tree and the data requested. For example, some implementations identify when to hoist subexpressions, such as a conditional subexpression, outside of a conditional expression. When the executable code is executed, a value is computed and saved for the hoisted expression, and the saved value is used when the subexpression is subsequently encountered. In this way, the subexpression is computed once for each row, and that computed value is reused when the same subexpression is encountered again. In some instances, the computed value is stored in a register of the CPU(s) 202. In some implementations, the compiler 242 and/or the optimizer 242 store data structures, such as hash maps and lists of the dependencies between query operators 228 in the memory 214, to support or guide the optimization passes;

the database engine 120 includes a query execution module 250, which executes the code 230 (sometimes herein called a query execution plan) generated by the query compiler 242; and the database engine 120 also includes a query memory manager 252, which tracks memory utilization by each of the processes, and dynamically allocates memory as needed. In some implementations, the memory manager 252 detects when there is insufficient memory while executing the compiled code. In some implementations, the query memory manager 252 communicates with the query execution module 250.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 214 stores a subset of the modules and data structures identified above. Furthermore, in some implementations, the memory 214 stores additional modules or data structures not described above.

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Standard relational database query engines rely on relational algebra trees (e.g., an operator tree 228) for evaluating logically optimized plans. A typical algebra tree 228 has the nice property that its leaves correspond to base relations and each node in the tree 228 can be evaluated based solely on nodes of its subtree. To evaluate a node in the tree, a typical "iterator engine" works by pulling intermediate results from the subtrees corresponding to children of the node.

Some database engines choose access paths as part of the logical optimization. The existence of an index on a joined column can enable the usage of index-nested loop joins and thereby influences the optimality of different join orders. Because of this, access paths are typically chosen as part of join reordering. Next, the database engine chooses a physical implementation for each of the algebraic operators in the operator tree. In some implementations, during this phase, the database engine also chooses the appropriate access path and indices to retrieve the requested data as fast as possible. The optimized operator tree is compiled to native machine code, according to some implementations. This compiled code is then loaded and linked with the database engine at runtime and executed. Thus, in some implementations, the database engine functions essentially as an optimizing JIT compiler for database queries.

In some implementations, in order to enable efficient code generation, implementations use a produce-consume execution model. In this execution model, the code for all operators is fused together, enabling the system to push one tuple at a time through the whole operator tree up to the next pipeline breaker.

In some implementations, the database engine uses "Morsel-driven parallelism." In this parallelization model, work is dynamically balanced between worker threads. Tuples are handed out to the worker threads in so-called morsels, which are chunks of a few thousand tuples. Worker threads take thread-locality into account when picking up morsels for processing.

In some implementations, the database engine's optimizer and query engine are decoupled from the database storage layer. This enables the database engine to work on a large set of different storage formats.

Figure 3A:
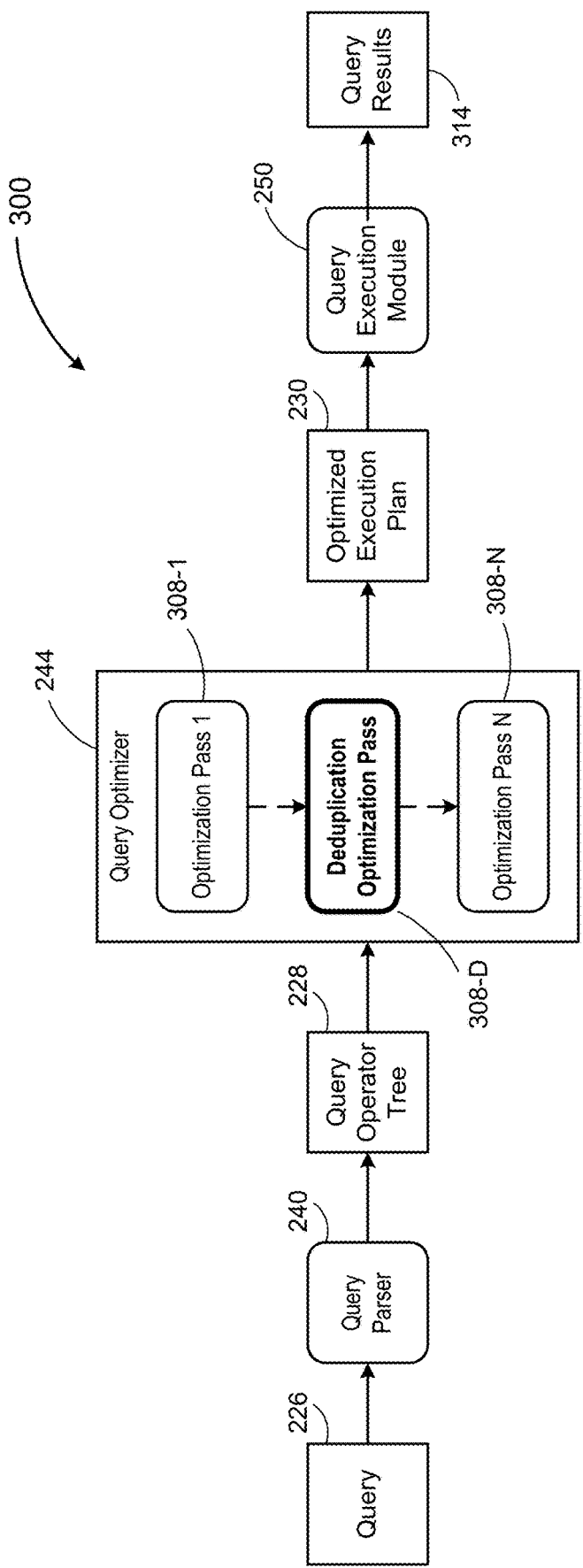
FIGS. 3A and 3B are block diagrams of query execution systems implemented by a computer system in accordance with some implementations.
Figure 3B:
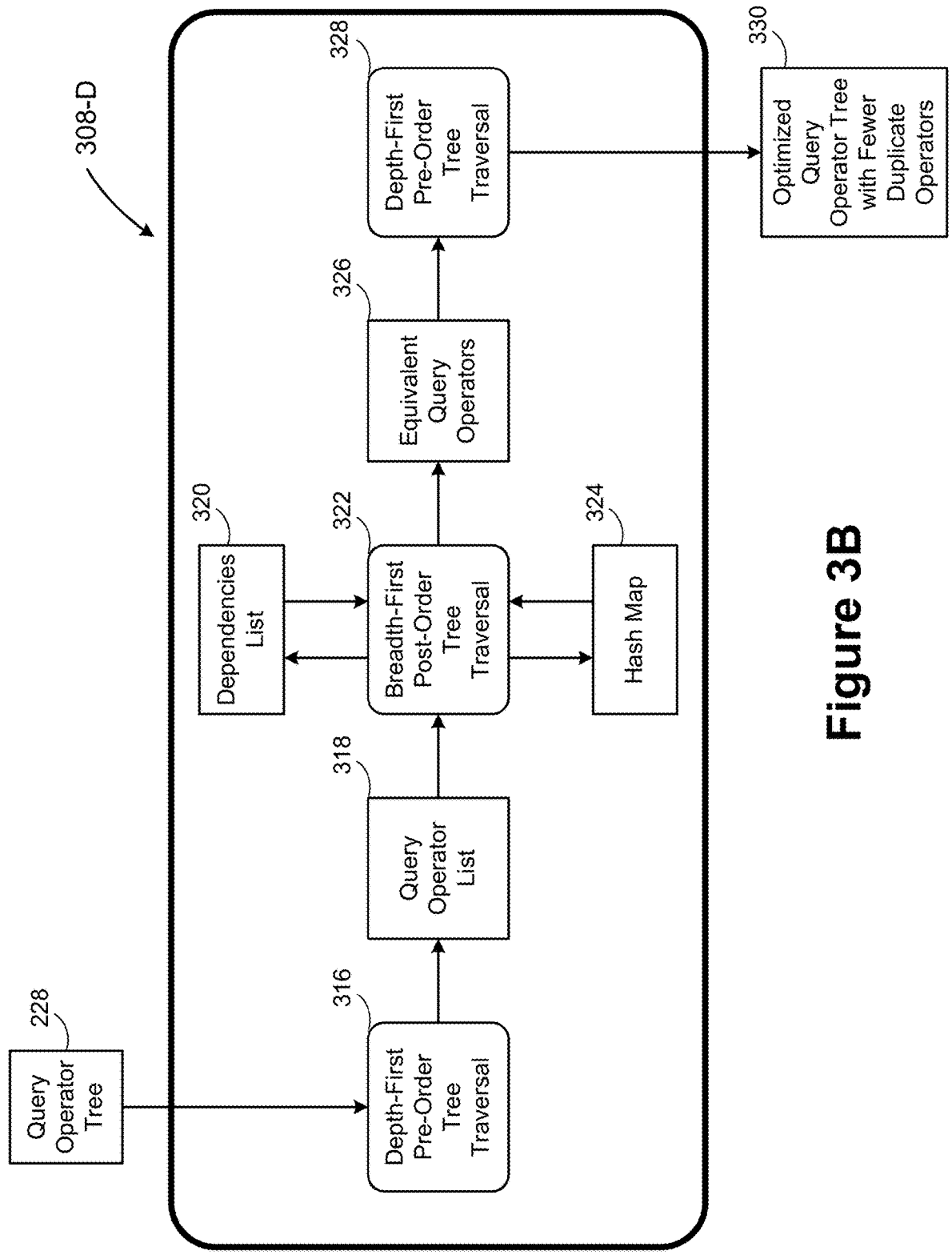

FIGS. 3A and 3B are block diagrams of query execution systems implemented by a computer system 200 in accordance with some implementations. The execution system 300 includes a query parser 240, which receives database queries 226 (e.g., SQL queries). The query parser 240 parses each database query 226 to form a query operator tree 228. An optimizer 244 performs one or more optimization passes 308 (e.g., the passes 308-1, 308-D, and 308-N) to optimize the query operator tree 228 to produce an optimized query operator tree, according to some implementations. A deduplication optimization pass 308-D takes, as input, the optimized query operator tree output by one or more initial optimization passes 308-1, and removes one or more duplicate query operators, according to some implementations. In some implementations, one or more final optimization passes 308-N following the deduplication optimization pass 308-D further optimize the query operator tree output to produce an optimized execution plan 230. Although in FIG. 3A, the box containing the optimization passes 308 is shown to produce the optimized execution plan 230, in some implementations, a compiler (e.g., the query compiler 242 described above in reference to FIG. 2) includes the optimization passes 308 as part of an optimizer (e.g., the optimizer 244), and the compiler produces an optimized execution plan (sometimes herein called query execution plan or code). As described above in reference to FIG. 2, an execution module (e.g., module 250) executes the code or optimized execution plan 230 to produce query results 314, according to some implementations.

In some implementations, an intermediate compiler compiles the query operator tree output by the optimization passes 308 to form an intermediate representation, which is subsequently compiled to an optimized execution plan 230. This step typically includes some logical optimization as well. In some implementations, an execution selector is coupled to the intermediate compiler. The execution selector identifies one or more query characteristics and one or more database characteristics to determine how to execute the query. In some implementations, the execution selector selects one of a plurality of execution options to process the intermediate representation. In some implementations, the plurality of execution options includes direct interpretation without compilation, compilation with no or little code optimization (e.g., "cheap" optimizations), and compilation with a more significant level of code optimization. The plurality of execution options have trade-offs between the query compilation time and the query execution time.

In some implementations, the execution selector implements a heuristic process to select an execution plan from the plurality of execution options. In some implementations, the heuristic process minimizes the sum of the query compilation time and the query execution time. In some implementation, the query compilation time is estimated based on the size of the intermediate representation. In some implementations, the query execution time is estimated based on the number of tuples (e.g., rows in the database 122) that will be accessed or touched for retrieving the result set corresponding to the database query 226.

In some implementations, the database query 226 is segmented into a plurality of subqueries, each of which is translated into an execution block. In some implementations, the segments are based on execution pipelines. In some implementations, the execution selector mentioned above handles each execution block corresponding to one of the plurality of subqueries individually. That is, the execution selector receives each execution block from the intermediate compiler, and identifies one or more query characteristics for the respective execution block. The execution selector estimates a query execution time and a query compilation time for the respective execution block. Then, the estimated query execution time and the estimated query compilation time are analyzed to determine whether they satisfy one or more of the interpretation criterion, the compilation criterion, and the optimized compilation criterion. The execution selector then selects one of a plurality of execution options to process the respective execution block corresponding to one of the plurality of subqueries. In some implementations, even when the database query 226 is not segmented, the intermediate representation is broken into a plurality of execution blocks. The execution selector then handles each execution block individually as described above.

In some implementations, the execution selector uses a similarity metric to compare new queries to previously executed queries when determining an execution option. In some implementations, the similarity metric uses time estimate data. In some implementations, the similarity metric compares characteristics of the tables accessed, such as identicality of the tables, table sizes, or the existence of indexes. In some implementations, the similarity metric compares query structure and/or complexity.

FIG. 3B is a block diagram illustrating a query deduplication optimization pass 308-D in accordance with some implementations. The query deduplication optimization pass 308-D includes a depth-first pre-order tree traversal 316 of an input query operator tree 228 to produce a query operator list 318 (e.g., a list of all query operators in the input query operator tree 228). Subsequently, the optimization pass 308-D traverses the query operator tree 228 in breadth-first post-order 322, guided by a hash map 324 (e.g., indexed by the query operator signatures) and/or a list of dependencies 320. In some implementations, the dependencies list 320 and/or the hash map 324 are updated during the course of the tree traversal 322. The tree traversal 322 produces a list of equivalent query operators 326. The deduplication optimization pass 308-D subsequently traverses the query operator tree 228 in depth-first pre-order 328, removing one or more tree equivalent or duplicate query operators from the query operator tree 228 to produce an optimized query operator tree 330, according to some implementations.

Example Terminology, Expression Optimization

As background information for the discussion below, a short description of the example terminology is provided.

The term "operator" refers to all query operators (e.g., SQL algebra operators), such as JOIN, SORT, SELECT, MAP and KMEANS. Operators operate on input sets and produce output sets. In contrast, the term "Expression" refers to scalar expressions. Expressions take several scalar arguments and return another scalar value, and include conventional expressions, such as "+" and "−". Expressions also include special SQL expressions, such as CaseExpressions, and implementation-specific expressions, such as the CachingExpressions. Furthermore, expressions also include expressions that take zero arguments, such as Constants and special functions such as CURRENT_USER.

The other terms that are used in the description below include "aggregates" and "Information Units (IUs)." Aggregates are used (e.g., in GROUPBys and Window queries) to aggregate a set of tuples into a single value. Example aggregates include SUM, MIN, MAX, and AVG. Another concept used in the description is that of an IU. An IU identifies a particular scalar value within a tuple during query optimization or code generation time. An IU is identified through its identity (e.g., through its memory address). An IU stores type information within its member variables. IUs only exist during optimization or code generation time, according to some implementations. In some implementations, when translating an algebra tree to Virtual Machine or assembly code, the IU abstraction gets removed and individual scalar values are identified by the registers in which they are living at the different points of query execution.

Some implementations apply Common Sub-Expression Elimination (CSE) to optimize expressions. In some implementations, CSE uses a getSignature function that returns an equivalence-aware hash of the expression tree. If the expression trees are equivalent, they will have the same signature. For example, expression trees "a+b" and "b+a" return the same signature. In some implementations, the only case where getSignature returns the same hash value for non-equivalent expressions is when there is a hash collision. Some implementations of CSE also use a function isEquivalent that checks equivalence for two expressions. This function is used because getSignature might return the same signature for non-equivalent expressions due to hash collisions.

Design of Deduplication Algorithm

Example implementations or design choices for the deduplication algorithm are described herein. Some implementations only deduplicate operators that are materializing anyway, and do not introduce temp operators. Some implementations reuse results of a query operator tree by scanning a materialized representation of the data multiple times without streaming the results of a subtree to multiple upstream consumers. In such cases, deduplicating an operator (e.g., a JOIN operator) would require the introduction of a TEMP operator that materializes the JOIN result so that it can then be reused by multiple EXPLICITSCAN operators. Introducing such a TEMP operator, although possible, could incur overhead. For example, when the JOIN produces a large result set, the complete result set is materialized and kept in memory. In some instances, just re-computing the JOIN result is less expensive than materializing and reading the JOIN result (e.g., due to memory bandwidth). Some implementations, therefore, do not introduce TEMP operators, and only deduplicate operators that must materialize their complete result anyway, such as GROUPBy and GROUPJOIN. In some implementations, deduplicating a GROUPBy operator also deduplicates all other query operators below that GROUPBy (i.e., child operators of the GROUPBy operator), including non-materializing operators, such as JOINs. In case there is no upstream materializing operator above the non-materializing duplicated operator, some implementations re-execute the non-materializing operator (the JOIN operator in the running example). In some implementations, materialized results are reusable, so the results of materializing operators are reused directly, rather than having to copy the results into a TEMP operator.

Some implementations apply the deduplication optimization pass only for complex queries as defined by a predetermined threshold taking into account various factors (e.g., the number of query operators). Some implementations detect, as early as possible, if query deduplication does not apply for a given query and, in such cases, bail out early.

In some implementations, deduplication optimization is one of several optimizer passes. In some implementations, the deduplication optimization pass is run after most other optimizations (e.g., a join reordering pass).

In some implementations, query fragment deduplication (sometimes called query operator deduplication or query deduplication) includes detecting query subsumption (or equivalence) given two query fragments, efficiently traversing the query operator tree, and deduplicating all subsumed query fragments. Before eliminating a subtree by replacing it with the results of a different subtree, the eliminated subtree and the replacement subtree are verified to produce equivalent results. In some implementations, establishing the equivalence of two operator trees includes proving syntactic equivalence on the algebra level. Some implementations consider two operators as equivalent if and only if (i) the input operators are equivalent, and (ii) operator properties (e.g., selection predicates, join conditions, scanned tables) are equivalent.

For leaf operators, since there are no input operators, condition (i) above is trivially true. Condition (ii) should not evaluate to false just because a non-constant value is involved in any expression. Some implementations refer to all non-constant values through IUs and each operator produces its outputs under unique IUs. This is so that, for example, columns from the different join sides can be disambiguated after joining the results table scans on the same table. Because IUs are unique, some implementations keep track of IUs that are equivalent in order to determine equivalence between query fragments. Some implementations use an IUMapping and use a modified form of the two-fold condition specified above, finding two operators to be equivalent if and only if (i) the input operators are equivalent, and (ii) operator properties (e.g., selection predicates, join conditions, scanned tables) are equivalent, given the IUMapping of the concerned input operators. Since this definition of equivalence is recursive, each operator provides an output IUMapping mapping its own output IUs onto the output IUs of another equivalent operator. In some implementations, each operator combines the IUMappings of its input operators in some operator-dependent way to provide the output IUMapping.

Figure 3C:
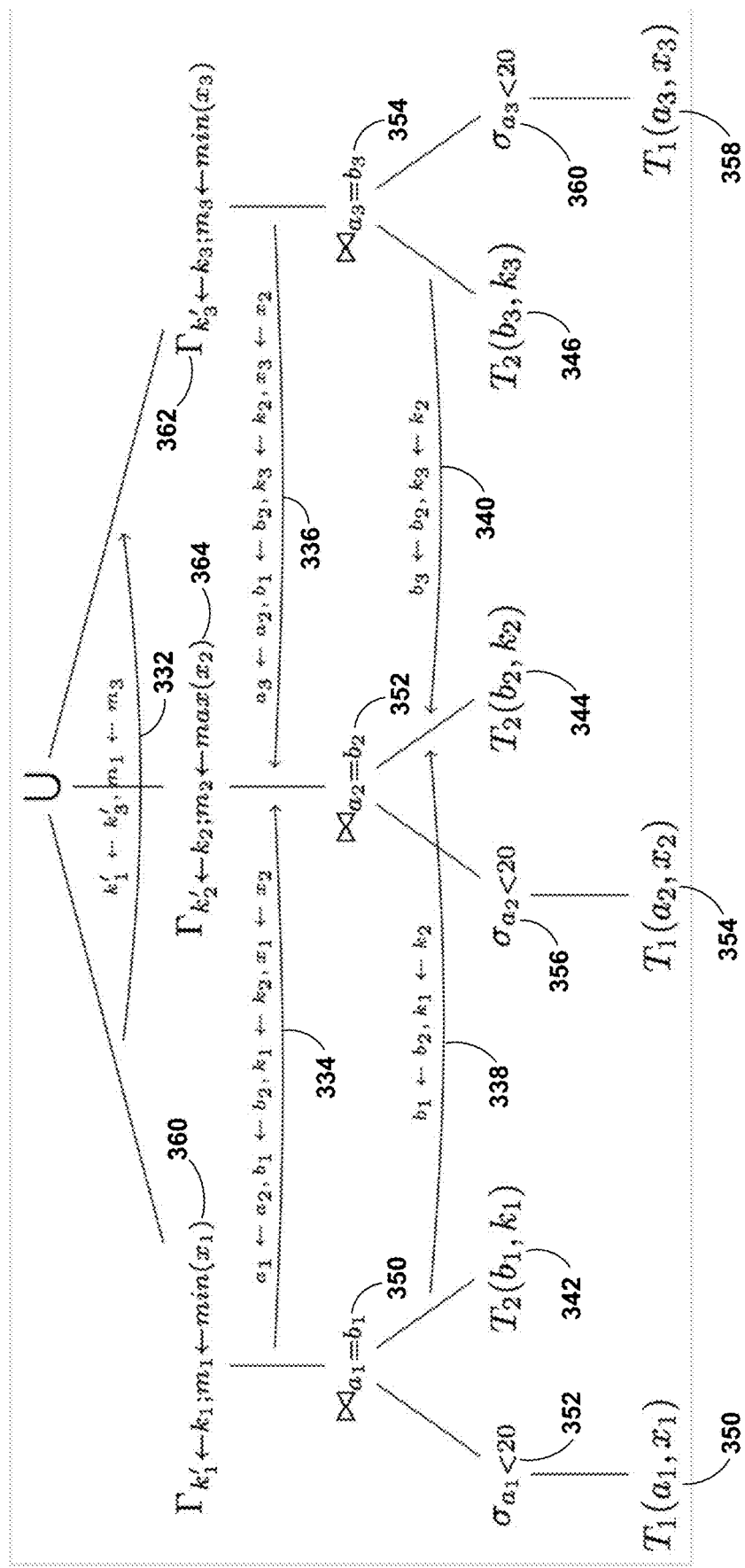
FIG. 3C illustrates an example query tree incorporating the concept of IUMappings used in a query deduplication optimization pass, according to some implementations.

FIG. 3C illustrates an example query tree incorporating the concept of IUMappings used in a query deduplication optimization pass, according to some implementations. The arrows 332, 334, 336, 338, and 340 indicate the IUMappings between the output of the various operators. In this example, the three table scans on T2 (the operators 342, 344, and 346) are equivalent. Some implementations only store two of the three IUMappings explicitly, and infer the third mapping by transitivity. In FIG. 3C, the mappings for the scan on T1 (the operators 350, 354, and 358) and the respective parent SELECT operators (the operators 352, 356, and 360) are hidden for brevity. Also, the three JOIN outputs 350, 352, and 354 are equivalent. However, the second GROUPBy operator 352 computes a different aggregate than the other two GROUPBy operators 350 and 354. Hence, at the top-level, there only exists an IUMapping 332 between the first GROUPBy operator 360 and the third GROUPBy operator 362. Some implementations combine the three GROUPBy operators 360, 362, and 364, into one common GROUPBy operator computing both the MIN and MAX at the same time using query fragment merging.

In some implementations, IUMappings map IUs from one tree fragment to another tree fragment. Conceptually, they are an unordered map that take IUs (or pointers to IUs) as arguments and have some utility functions.

In some implementations, a function (e.g., a getSignature C++ function) provides a semantic-aware hash of the operator sub-tree, and use hash-based structures (an unordered map) to index operator trees. Some implementations use a function (e.g., a C++ function with the signature establishEquivalenceMapping (Operator& other)), which establishes an equivalence mapping between the output IUs of two operators (e.g., "this" operator and the "other" operator in the C++ example). Some implementations establish equivalence based on the operator's particular semantics and on the IUMappings for its input operators. Some implementations distinguish an empty IUMapping from a non-existing IUMapping. A non-existing IUMapping means that equivalence for the operator tree could not be proven. An empty IUMapping, on the other hand, means that both operator trees produce the same number of tuples, but none of their IUs map onto each other. Some implementations also handle transitivity of equivalence mappings.

In some implementations, functions used to get signature and/or establish equivalence (e.g., the getSignature and establishEquivalenceMapping functions described above) ignore minor differences between the algebraic representations. For example, in some implementations, the following query fragments:

... (SELECT SUM(a) AS s1, MIN(b) AS m1 FROM t1)
...
and
... (SELECT MIN(b) AS m2, SUM(a) AS s2 FROM t1)
...

are detected as equivalent with the mapping s1->s2 and m1->m2, even though the produced column names differ and the order of the aggregates differs. Some implementations use this equivalence when, at the algebra level, the original order of aggregates within a GROUPBy operator is not preserved. Instead, in such cases, the order of aggregates on the algebra tree depends on internal, unstable pointers and might be different even if the original query listed the aggregates in the same order. Some implementations use a similar concept of equivalence for other operators. Some implementations detect equivalence for join operators even if the input operators are flipped. Some implementations detect equivalence for the set operations UNION [ALL], INTERSECT [ALL], and/or EXCEPT [ALL] without taking the order of the produced columns into consideration. Some implementations detect equivalence for TABLESCAN operations without taking individual restrictions (for the operation) into account.

Some implementations optimize the getSignature or a similar function for speed. For example, some implementations do not include all parts of an operator that might influence the operator's equivalence with another operator. For example, the signature of the TableScan does not include the residuals and restrictions; it only includes the scanned relation id and the number of predicates. Although there will be hash collisions in some cases, the hash collisions don't influence the algorithm's correctness since other functions (e.g., the establishEquivalenceMapping function) filters the operators out. Some implementations trade off hash collisions for hashing speed. In some implementations, for most operator trees, the "cheap" hash is already sufficient to prove that there is no opportunity for query-deduplication. So by keeping the signature computation cheap, some implementations make the process of bailing out early even faster than without the cheap hash.

In some implementations, in the getSignature or establishEquivalenceMapping functions, operators such as Map and Select check if the contained expressions are equivalent. Some implementations use functions used by the CSE algorithm (e.g., the getSignature and isEquivalent functions described above in reference to CSE) for checking equivalence. Some implementations extend the functionality used in CSE to support IUMappings before reusing the extensions for checking equivalence. Some implementations take commutativity of operators into account when checking for equivalence. For example, the operation (IU1+IU2)–IU3 is equivalent to (IU4+IU5)–IU6, given the mappings {IU1->IU4, IU2->IU5, IU3->IU6}, or the mapping {IU1->IU5, IU2->IU4, IU3->IU6}, but the two are not equivalent with the mappings {IU1->IU6, IU2->IU5, IU3->IU4}, or {IU1->IU5, IU2->IU6, IU3->IU4}. The second set of mappings leads to equivalence due to the commutativity of the "+" operator.

Example Deduplication Algorithm

At the high level, the deduplication algorithm comprises three tree traversals, according to some implementations. First, a depth-first pre-order traversal of a query operator tree collects operators in the query operator tree (e.g., as a list) and dependencies among the operators (e.g., as a list of dependencies). Second, a dependency-aware breadth-first post-order traversal of the query operator tree detects equivalent subtrees by utilizing a hash map indexed by the operators' signatures. Finally, a third depth-first pre-order traversal of the query operator tree removes detected duplicated query fragments detected in the previous step by introducing reference nodes (e.g., EXPLICITSCAN) over materializing operators, leaving non-materializing operators alone.

For the first step, some implementations enumerate potentially duplicated sub-trees within a query. In some implementations, sub-trees are visited in a certain enumeration order: an operator is visited only after equivalences for all of its input operators are established. Each operator that might be potentially deduplicated is visited at least once, according to some implementations. In some implementations, each operator that might be potentially deduplicated is visited at most once. Some implementations skip as many ineligible operators (e.g., operators that are not candidates for the deduplication optimization pass) as possible. Some implementations detect query operator trees that are unlikely to benefit from the query deduplication optimization pass as early as possible, and aborting the search and replace process.

Some implementations enumerate the query operator tree in a breadth-first post-order traversal. By using a post-order traversal, some implementations ensure that an operator is only visited after all its inputs were visited. For example, the IUMappings for the operator's inputs are available before visiting the operator itself. A breadth-first search is preferred over a depth-first search since a breadth-first search allows an implementation to stop the exploration of whole subtrees earlier. If the breadth-first search did not find an equivalence mapping for all inputs of an operator, there is no point in visiting the operator itself. In most queries, the algorithm can therefore already terminate after visiting only the leaf nodes, if it is not possible to find any equivalences for those leaf nodes.

In some implementations, the breadth-first traversal is implemented by tracking a set of outstanding dependencies for each operator. The algorithm picks an operator from the list of outstanding operators that has no outstanding dependencies and visits that operator. If the visit was successful (i.e., if the algorithm found another operator that is equivalent to the given operator) the algorithm marks the dependency as fulfilled, thereby potentially unblocking operators that are dependent on the current operator. If the visit was not successful (i.e., if there was no other equivalent operator) the algorithm keeps the dependency blocked. Thereby, none of the parent operators get visited. With this methodology, the algorithm would not find an equivalent operator for the parent operators because the algorithm did not find an equivalence for the parent operators' input operator.

In some implementations, the initial traversal of the tree takes additional dependencies of operators into account. For example, an EARLYPROBE tree node is not visited before the left side of a corresponding JOIN node or operator is visited. Some implementations ensure this traversal order by adding an artificial dependency between the EARLYPROBE tree node and the left side of the JOIN.

In some implementations, the functionality of the first tree traversal is folded into or performed as part of the second tree traversal. Similarly, some implementations combine the second and the third tree traversal into a single step. Combined tree traversals can still identify and replace some or all of the redundant duplicate query operators depending on the tree structure. Some implementations use a heuristic approach for deciding the type of tree traversals based on an initial identification of the query operator tree type (e.g., via pattern matching), and/or the application type.

Hash-Based Deduplication

While traversing the tree bottom-up using the previously introduced dependency-aware breadth-first traversal, some implementations keep a hash map containing all visited operators. This hash map is indexed by an operator's signature (e.g., the Operator::getSignature). By looking up the current operator in this hash map, the algorithm can quickly get all potentially equivalent operators. For each of those potentially equivalent operators, the algorithm checks whether it can establish an equivalence mapping. If such a mapping exists, the algorithm remembers that equivalence mapping and marks the corresponding dependency in the breadth-first traversal as fulfilled, according to some implementations. Example pseudo-code for this process is provided in FIG. 6.

In the pseudo-code in FIG. 6, an operator only gets unblocked if there exists an equivalence for it. Otherwise, the operator stays blocked and all dependent operators will not get visited, thereby effectively pruning the traversal and aborting the algorithm early.

Replacing Duplicated Query Fragments

After the previous step, the algorithm has collected a list of equivalent operators (e.g., "equivalences" in the FIG. 6 pseudo-code). Some implementations subsequently perform a depth-first pre-order traversal of the query operator tree. During this traversal, the algorithm deduplicates all duplicated operators the algorithm encounters by introducing EXPLICITSCAN operators, according to some implementations. Some implementations find other operators equivalent to the currently visited operator by using the "equivalences" established in the previous step. By eliminating equivalences top-down, some implementations ensure that the algorithm does not unnecessarily introduce ExplicitScan operators within subtrees that will be removed later because they can be deduplicated further up the tree. Some implementations eliminate "materializing" operators that materialize their whole result (e.g., GROUPBy, SORT, WINDOW, and TEMP). The results of these operators can be scanned multiple times without additional overhead. On the other hand, for non-materializing operators, a TEMP operator is introduced that keeps the temporary result around for reuse. When this is sub-optimal for performance, some implementations avoid keeping temporary results for reuse.

In some implementations, introducing EXPLICITSCAN requires re-parenting the concerned IUs. This step implicitly invalidates the IUMappings established by the earlier step that established IUMappings (e.g., Operator::establishIUMapping in the previous phase). This invalidation is another reason why some implementations split detection and elimination of duplicated query fragments into two separate stages.

Some implementations integrate the deduplication optimization pass within a join reordering pass and detect more instances of shared sub-trees than possible when the deduplication pass is implemented as a stand-alone pass.

In some instances, identical query trees are modified by selection pushdown/introduction of early probes in ways that make them no longer equivalent. For example, for the query SELECT s1.sum, s2.sum
FROM (SELECT SUM(a) AS s FROM t1 GROUP BY k) s1
JOIN (SELECT SUM(a) AS s FROM t1 GROUP BY k) s2 ON s1.k=s2.k
WHERE s1.k< >'exclude' the restriction on s1.k is pushed down into s1 first and with the pushed-down restriction, the trees for s1 and s2 are no longer equivalent, thereby preventing deduplication. Similarly, the introduction of EARLYPROBE operator can interfere with query deduplication. In some implementations, EARLYPROBE operations are introduced depending on the estimates and thereby seemingly innocent changes to estimates can inhibit query deduplication. Some implementations deal with the aforementioned EARLYPROBE issue and similar inhibiting upstream transformations/optimizations by either tuning the respective upstream optimizations, or by turning off those optimizations, considering performance trade-offs.

The algorithms and implementations described here support deduplication for a variety of query operator types, including ASSERTSINGLE, EARLYPROBE, EXPLICITSCAN, EXTERNALFORMATSCAN (various formats, also including TDEs), GROUPBy, JOIN (including all inner/outer/single variants), MAP, SELECT, all set operations (UNION [ALL], INTERSECT [ALL], and EXCEPT [ALL]), SORT (also including LIMIT without ORDER BY clause), TABLECONSTRUCTION, TABLESCAN, TEMP, and VIRTUALTABLE.

Example Query Graphs

Figure 4A:
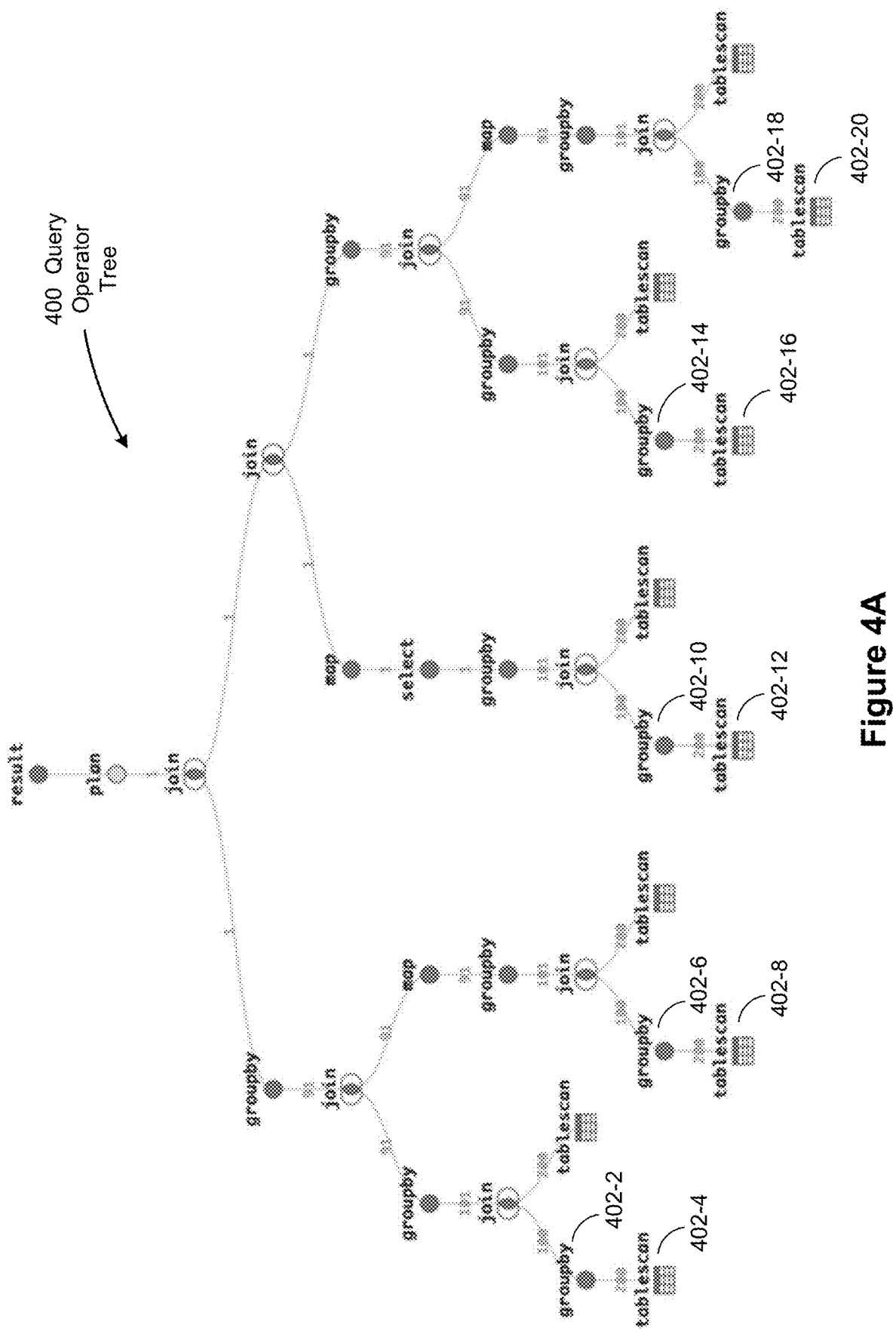
FIGS. 4A-4L illustrate query operator trees and how they are optimized by eliminating duplicate fragments, in accordance with some implementations.
Figure 4B:
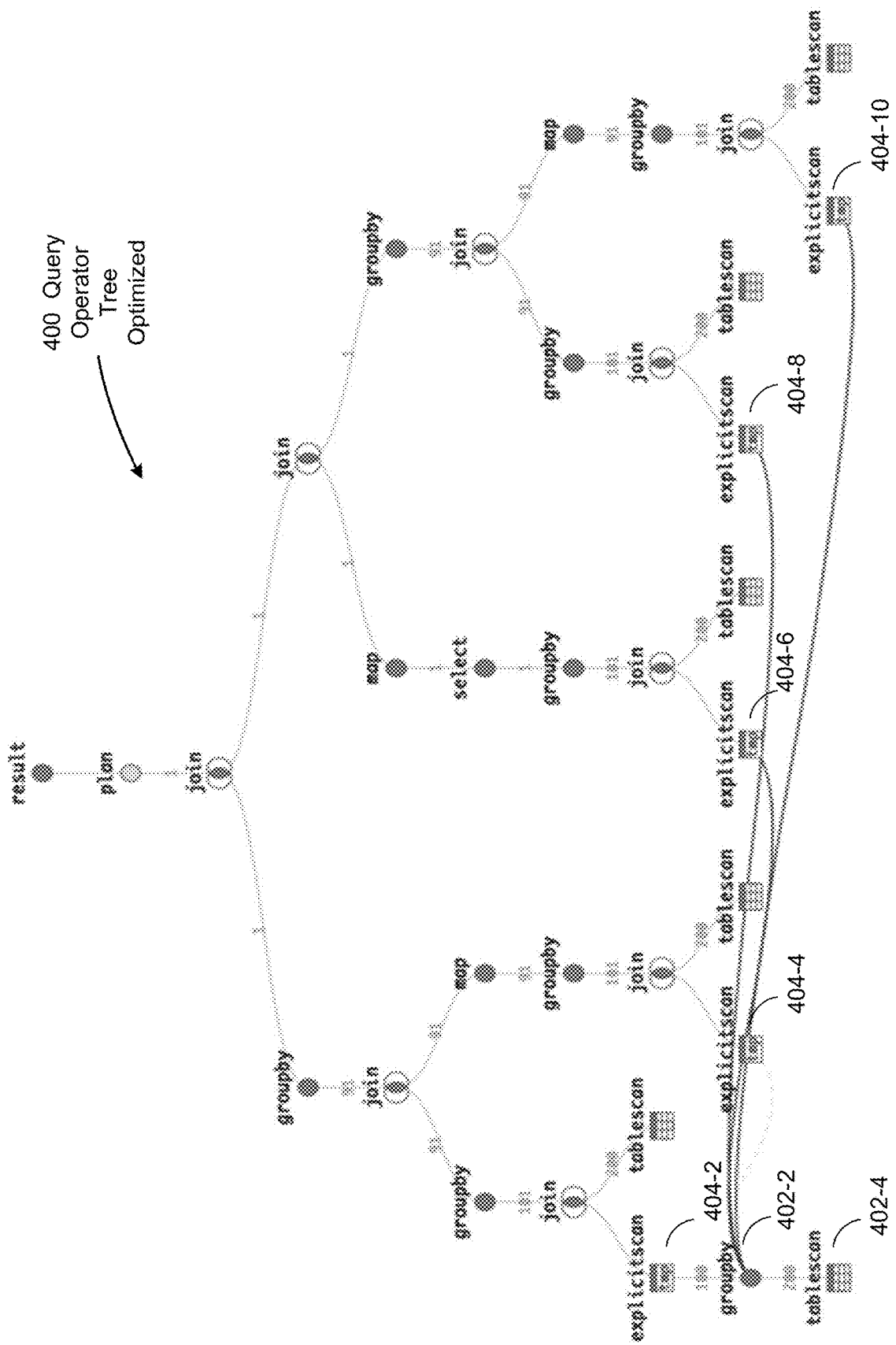

FIGS. 4A-4L illustrate several examples of query operator trees (sometimes called query graphs) optimized by the query deduplication optimization pass described herein in accordance with some implementations. FIG. 4B is an optimized version of the query operator tree 400 shown in FIG. 4A, in accordance with some implementations. In FIG. 4A, the query operator 402-2 (a GROUPBy operator) with a child query operator 402-4 (a TABLESCAN operator) is seen duplicated several times (the operator 402-6 with the child operator 402-8, the operator 402-10 with the child operator 402-12, the operator 402-14 with the child operator 402-16, and the operator 402-18 with the child operator 402-20). In FIG. 4B, the query operator 402-2 is replaced with a new query operator 404-2 (an EXPLICITSCAN operator) with the query operator 402-2 as its child operator. The other duplicate query operators (the operators 402-6, 402-10, 402-14, and 402-18) are replaced with new "explicitscan" query operators 404-4, 404-6, 404-8, and 404-10, which refer (as indicated by the lines) back to the first operator 402-2. In some implementations, the references are implemented using an extended query graph representations with cross-references. The cross-references decrease both compilation time and execution time of the affected queries.

Query operator trees, such as the tree shown in FIG. 4A, are common in complex workbooks in data visualization applications 222 and result from queries that involve Level-of-Detail computations or Top-N filters. As described above, at a high level, the identification and replacement or removal of duplicates queries (sometimes called query fragments) include proving the equivalence of two different relational operator trees, a process that is implemented via query subsumption, according to some implementations. In some implementations, query subsumption is shared with other optimization passes, such as multi-query optimization, which optimizes query batches for dashboards, caching of query fragments across queries, query optimization in the presence of materialized views, and generation of optimal update plans for materialized views.

Figure 4C:
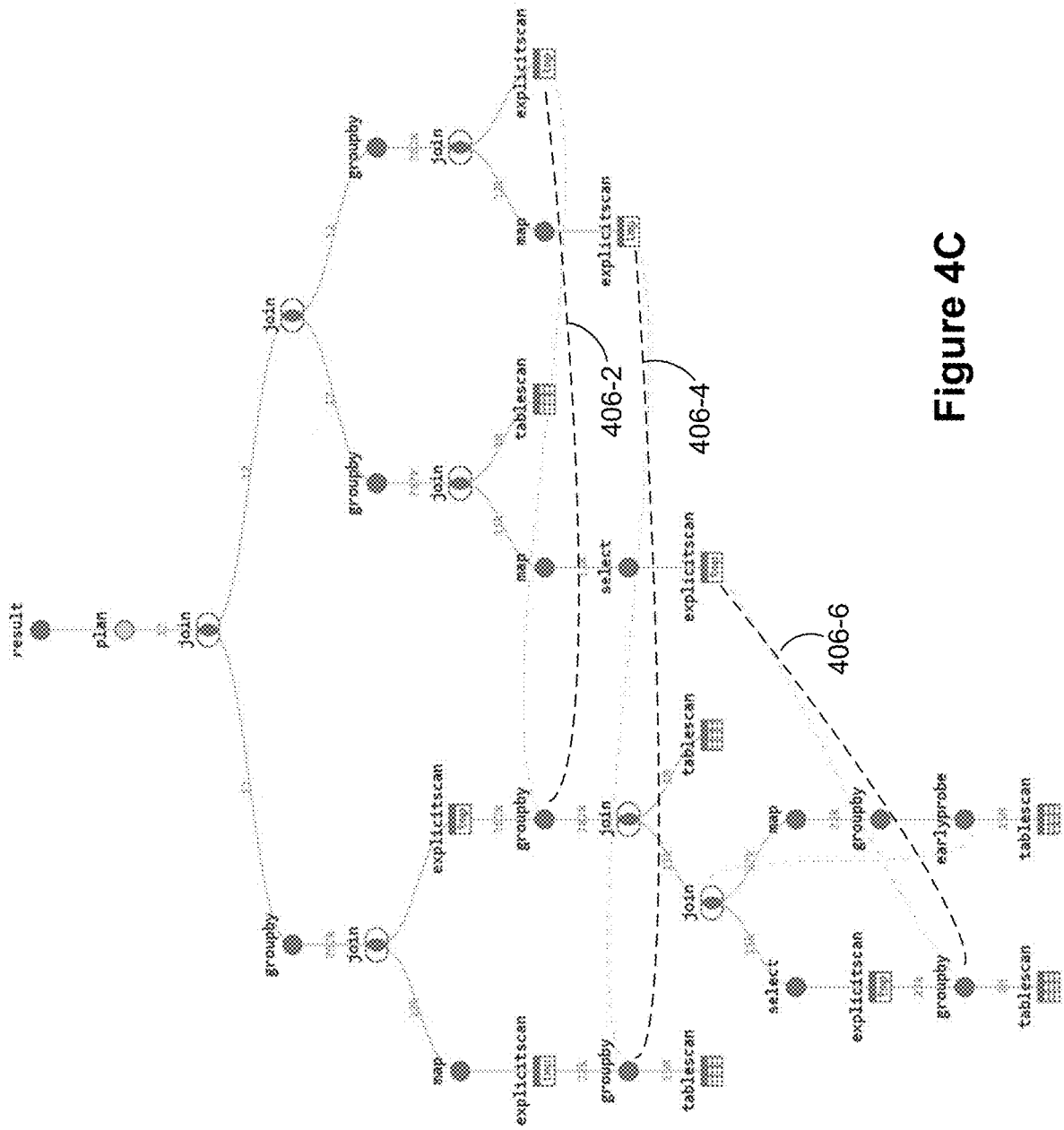
Figure 4D:
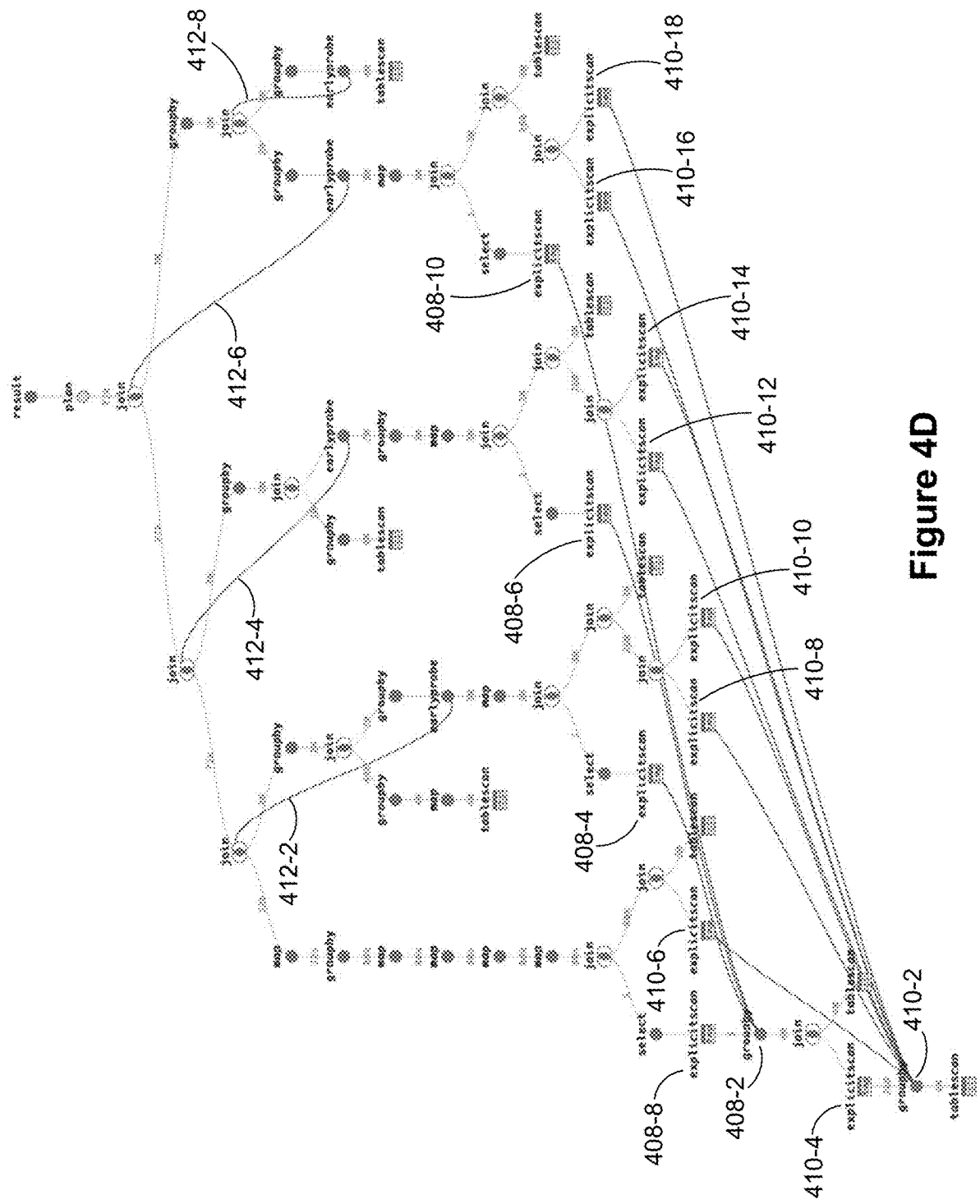

FIG. 4C illustrates an example query operator tree with several duplicate query operations, according to some implementations. The dashed lines 406-2, 406-4, and 406-6 from EXPLICITSCAN operators on the right hand-side of the query operator tree to the left-hand side of the query operator tree indicate the right sub-tree is mostly a duplicate of the left sub-tree of the query operator tree. Removing duplicate operations and replacing the operations with cross-references (e.g., EXPLICITSCAN operators), as illustrated in FIG. 4C, substantially reduces compile time as well as query execution time. FIG. 4D illustrates another example query operator tree where duplicate GROUPBy operators are replaced with EXPLICITSCAN operator nodes. The nodes 408-4, 408-6, 408-8, and 408-10 (originally GROUPBy operators) are EXPLICITSCAN operator nodes that refer to the result of GROUPBy operator 408-2. Similarly, the nodes 410-4, 410-6, 410-8, 410-10, 410-12, 410-14, 410-16, and 410-18 (originally GROUPBy operators) are EXPLICITSCAN operator nodes that refer to the result of GROUPBy operator 410-2. The tree could be further optimized, but the EARLYPROBE operators indicated by the lines 412-2, 412-4, 412-6, and 412-8 inhibit query fragment deduplication in the respective fragments.

Figure 4E:
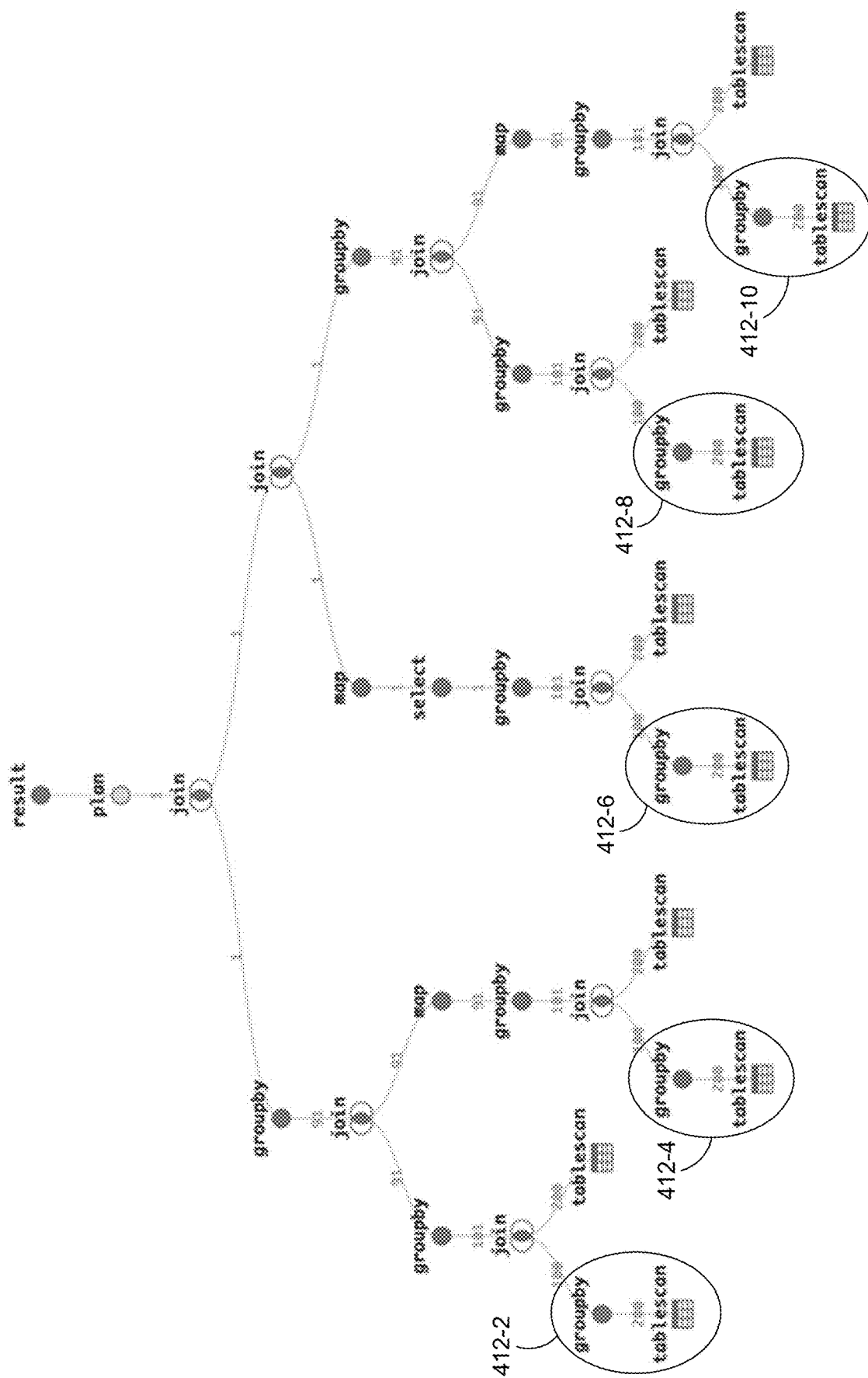
Figure 4F:
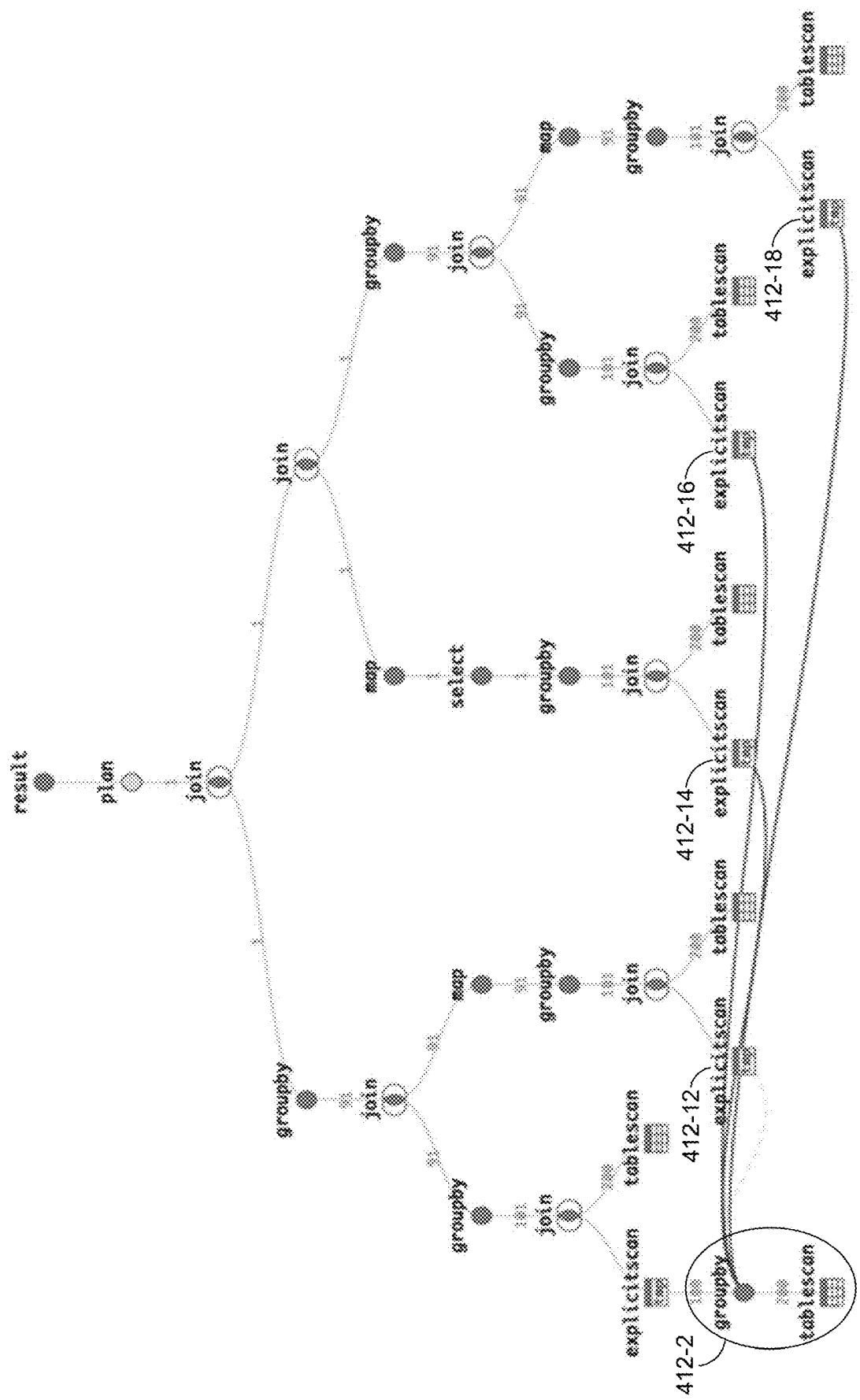
Figure 4G:
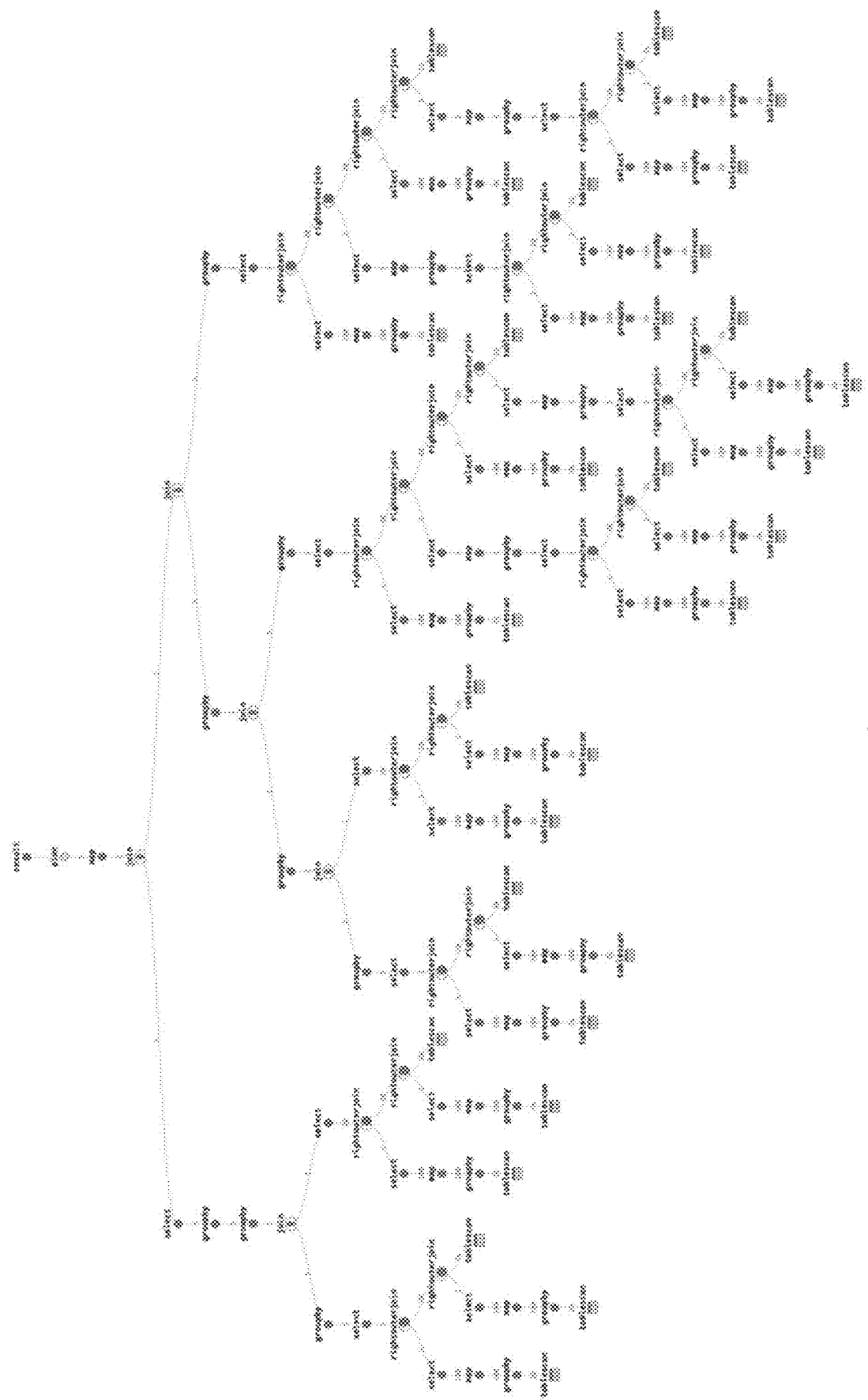
Figure 4H:
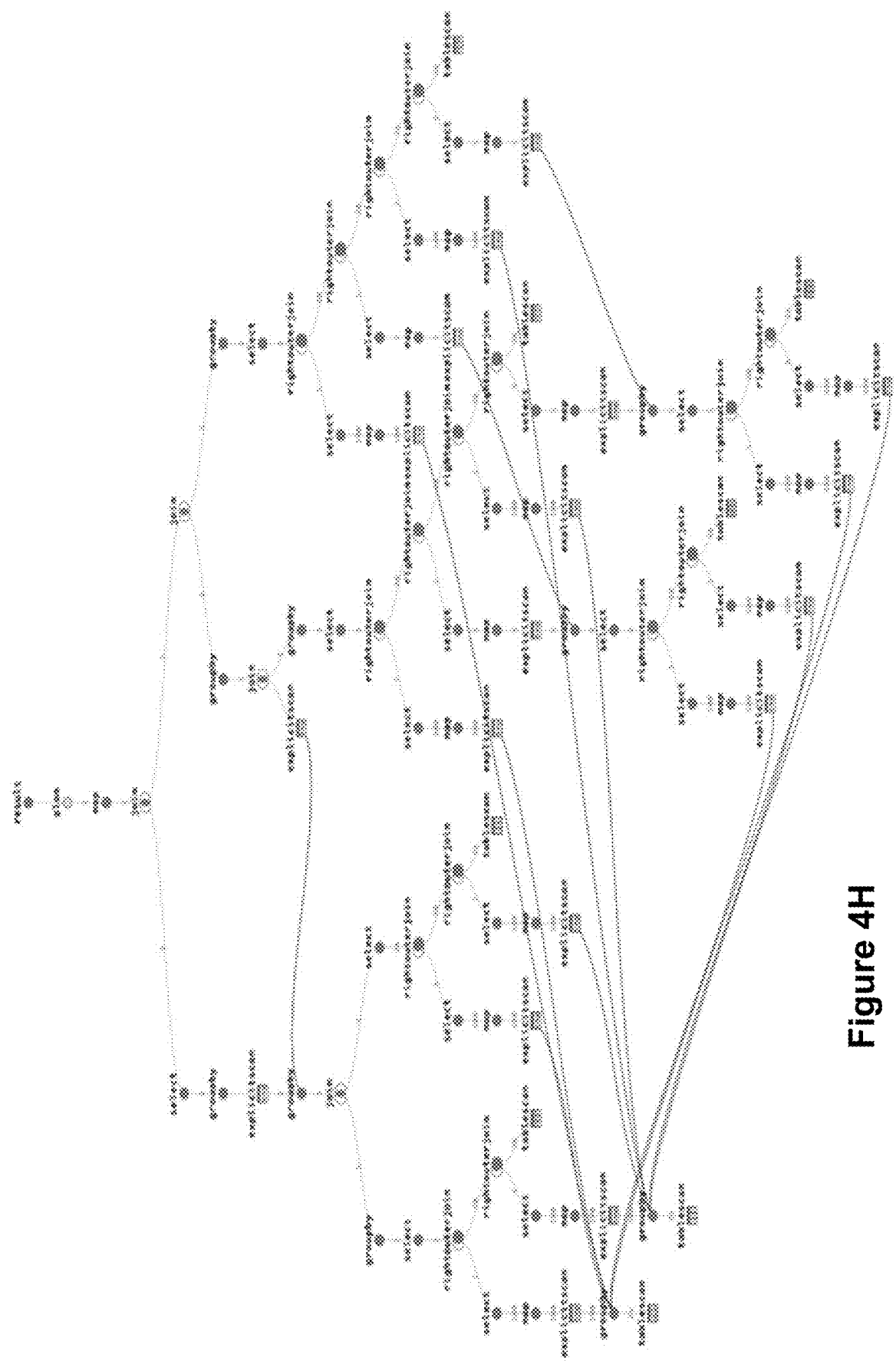
Figure 4I:
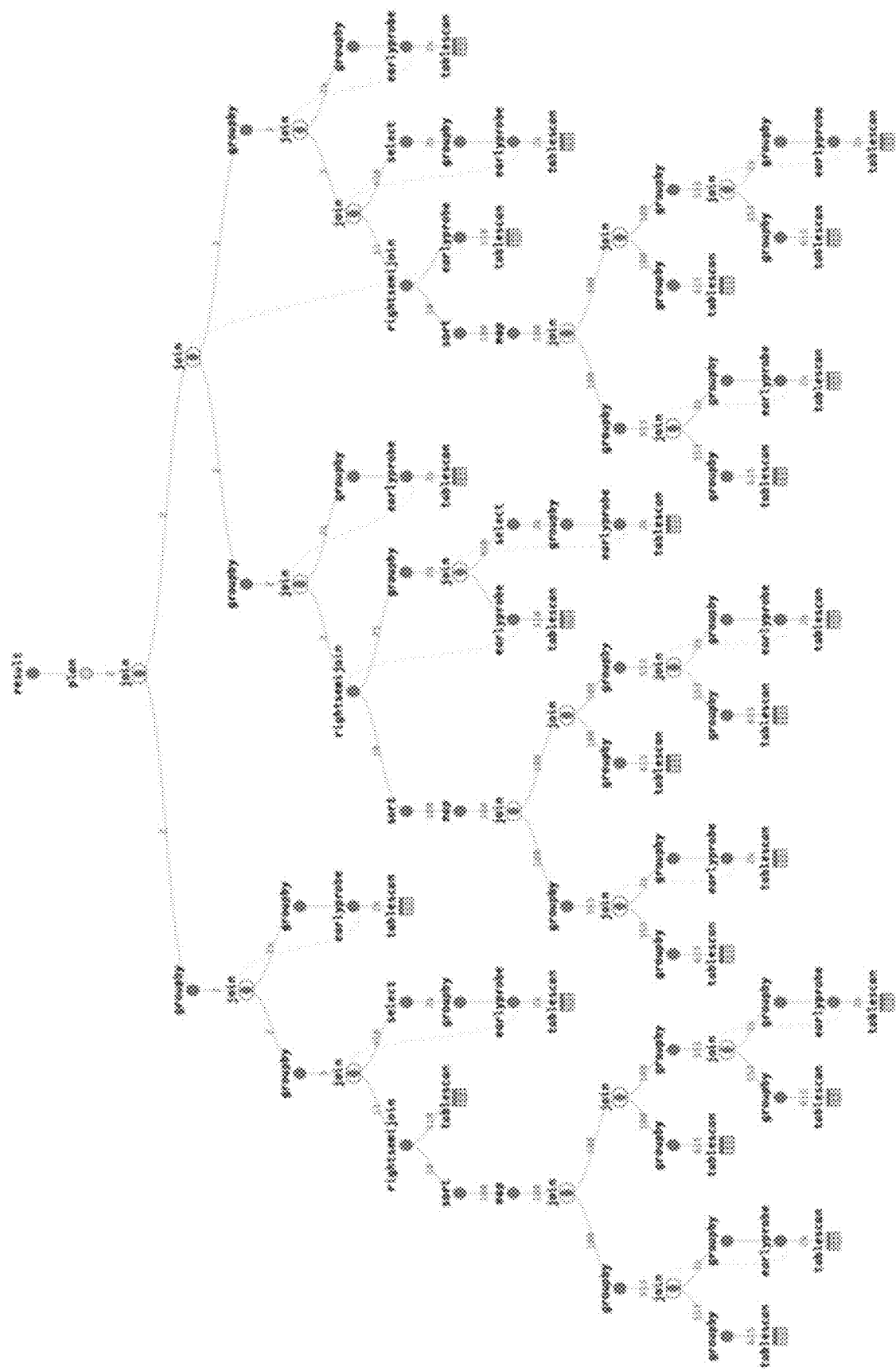
Figure 4J:
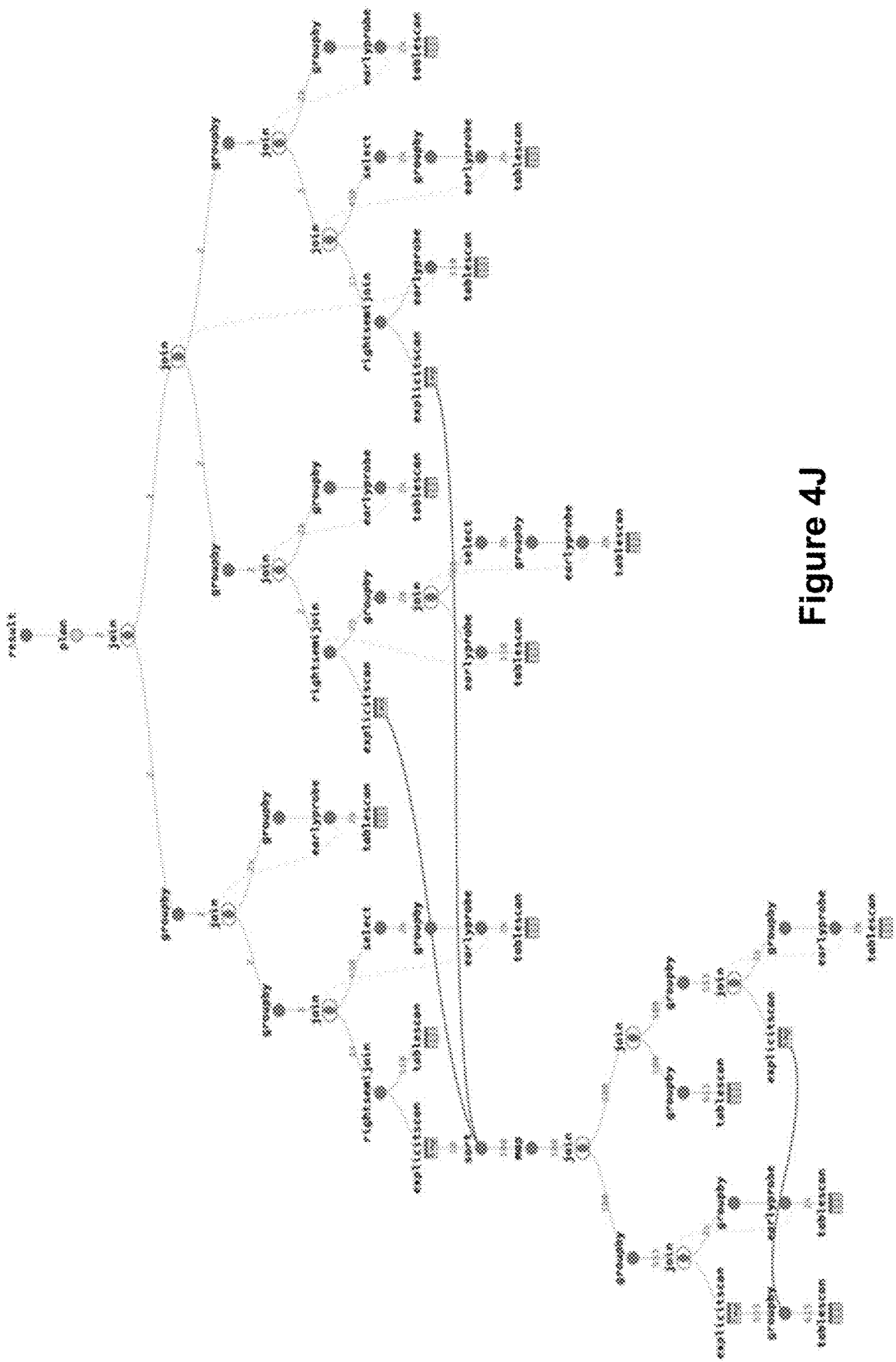

FIGS. 4E-4K provide further illustrative examples of query fragment deduplication, according to some implementations. FIG. 4F shows an operator tree that is an optimized version of the query operator tree shown in FIG. 4E. In FIG. 4E, the sub-tree 412-2 (a GROUPBy operator) with a child query operator (a TABLESCAN operator) is seen duplicated several times (in the sub-trees 412-4, 412-6, 412-8, and 412-10). In FIG. 4F, the sub-trees 412-4, 412-6, 412-8, and 412-10 are replaced with EXPLICITSCAN operator nodes 412-12, 412-14, 412-16, and 412-18, with references to the sub-tree 412-2. Similarly, FIG. 4H shows an optimized version of the query operator tree shown in FIG. 4G, and FIG. 4J shows an optimized version of the query operator tree shown in FIG. 4I, according to some implementations.

Figure 4K:
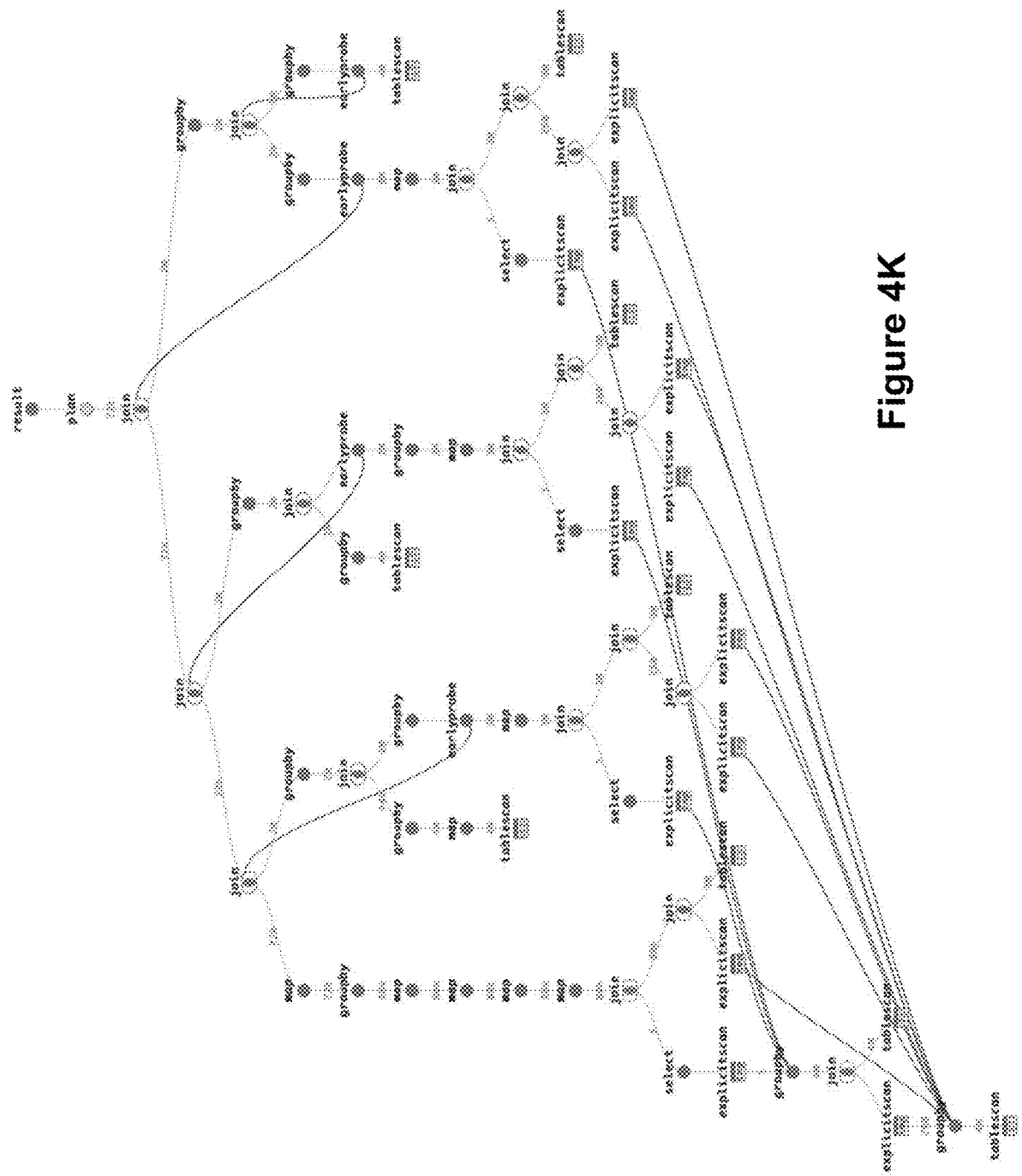

FIG. 4K shows an example optimized operator tree (the lines across the sub-trees show deduplicated operators) with redundant joins, according to some implementations. In FIG. 4K, one or more GROUPBY operators are joined with itself, and the join condition turns this join into a Key-Key-Join. Since both sides of the JOIN operator are identical, the join is removed altogether in some implementations.

Query Fragment Merging

Figure 4L:
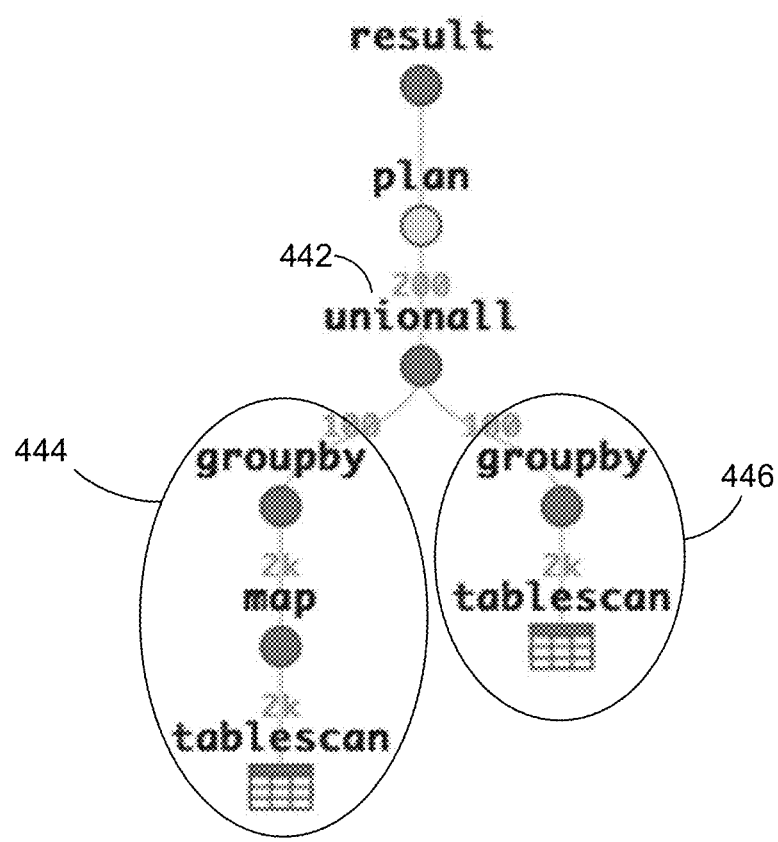

Instead of only deduplicating identical subqueries, some implementations construct subqueries that subsume both subqueries at hand and replace both scans by this combined query. For example, in the following query SELECT a, SUM(b), COUNT(b) FROM Extract GROUP BY a UNION ALL
SELECT a, SUM(b), AVG(b) FROM Extract GROUP BY a the two GROUPBy operators are combined into just one GROUPBy operator as follows:

WITH combined AS (SELECT a, SUM(b), COUNT(b), AVG(b) FROM Extract GROUP BY a)
SELECT a, sum, count FROM combined UNION ALL
SELECT a, sum, avg FROM combined Some implementations recognize that it is cheaper to compute multiple aggregates with one table scan instead of computing them separately using multiple table scans. Besides being able to merge the aggregate lists of GROUPBy operators, some implementations use "transparent" operators that are transparent for the purpose of tree comparison (i.e., the presence of these operators would not cause the tree comparison to fail. For example, for the query:

SELECT a, SUM(calc) FROM (SELECT a, b+c AS calc FROM Extract) GROUP BY a UNION ALL
SELECT a, SUM(b), AVG(b) FROM Extract GROUP BY a the query plan has the form shown in FIG. 4L, according to some implementations. Note how the left sub-tree 444 and the right sub-tree 446 of the UNIONALL operator 442 have a different shape. The sub-tree 444 contains an additional MAP operator. This operator should not inhibit the merging of both trees, since it only adds additional columns but passes on all other columns unchanged. Similarly, the following operators have the same property:

WINDOW operators: By definition, they only add columns while forwarding all pre-existing columns;
Key-Foreign Key-Joins: A KFK-Join only adds columns. It does not filter out or duplicate tuples. In particular, all joins used for LOD-calcs (common in a data visualization application 222) are KFK-joins. Some implementations track foreign-keys in the optimizer and detect KFK-joins.

Furthermore, some implementations adjust tree traversals in order to discover additional opportunities (e.g., to handle recursive operations or nested GROUPBy operators) for query fragment merging and/or query fragment deduplication.

Aggregation Hierarchies

Some implementations introduce aggregation hierarchies. For example, some implementations rewrite the query SELECT a, b, SUM(c) FROM Extract GROUP BY a, b UNION ALL
SELECT a, NULL, SUM(c) FROM Extract GROUP BY a by using the first GROUPBy's result to compute the second GROUPBy as follows:

WITH agg1 AS (SELECT a, b, SUM(c) FROM Extract GROUP BY a, b)
SELECT a, b, sum FROM agg1 UNION ALL
SELECT a, NULL, SUM(sum) FROM agg1 GROUP BY a Some implementations use a hash table indexing the inputs of all GROUPBys and then merge GROUPBys that are applied on top of equivalent inputs.

In some implementations, aggregate functions are annotated with information on how to compose/decompose them. For example, the optimizer knows that SUMs can be computed on top of other SUMs, but AVGs first need to be decomposed into SUM/COUNT.

Recycling and Intermediate Result Caching

Some implementations cache intermediate results such as GROUPBy hash tables and SORT heaps and reuse them between queries. Some implementations persist this cache (for example to accommodate packed workbooks so that future loads and first impressions are fast). Some implementations separate how or where memory is allocated for HashTables or SORT operators from a query state. Some implementations use a caching strategy, such as an LRU algorithm, to cache intermediate results.

Some implementations use Temp-Tables for result caching. When temporary tables (e.g., filter tables, group tables) are part of a query, some implementations prove that two temp tables across different session are equivalent. Some implementations do not prove this equivalence, and instead use other techniques to improve cache hit rate, such as crossDB temporary database, or non-persisted shared tables.

Inter-Query Optimization

Some implementations deduplicate subqueries across queries within a query batch. By construction, query batches tend to contain a lot of duplication. By deduplicating and/or merging query fragments across query boundaries, some implementations avoid duplicate computations. Some implementations turn a predefined operation (e.g., ExecutionTarget) into an algebra operator, and combine individual queries using a top-level operator (e.g., a UNIONALL operator). Some implementations manage (for example, using Postgres® or a similar protocol) the sending of query batches and receipt of results in such a way so as to enable this inter-query optimization. Some implementations perform inter-query optimization for dashboard scenarios where all queries are available. Because all of the queries are available at the same time, some implementations merge GROUPBy operators (see the section above on "Query Fragment Merging").

Some implementations avoid propagating errors between merged but otherwise unrelated queries. For example, if an exception occurs within a subtree only used by one of the merged queries, some implementations continue executing the other queries that might still finish successfully. When temporary tables (e.g., filter tables or group tables) are part of a query, some implementations prove that two temp tables across different session are equivalent, and other implementations avoid combining queries involving temp tables across sessions.

Materialized View Updates

Similar to inter-query optimization, some implementations combine queries for updating of materialized views. For example, in the following scenario:

CREATE MATERIALIZED VIEW viz1 AS (<query1>) WITH NO DATA;
CREATE MATERIALIZED VIEW viz2 AS (<query2>) WITH NO DATA;

CREATE MATERIALIZED VIEW viz3 AS (<query3>)
    WITH NO DATA;
REFRESH MATERIALIZED VIEW viz1, viz2, viz3;
some implementations optimize all three underlying queries together.

Some implementations (e.g., Tableau applications) use this feature by declaring one materialized view for each visualization (sometimes called a "viz") or filter in a dashboard. As soon as all views are in place, all views are refreshed at once. Thereby, the database server system can optimize all queries necessary for a workbook at once. Some implementations rely on Postgres® representations for optimizations related to materialized views. In some implementations, Insert, Delete, or similar operations in algebra representations are used for materialized view optimizations. Some implementations use temporary tables ("Temp Tables") for implementing these features.

Deduplication within SQL and Database User Defined Functions

User defined functions allow specifying multiple statements within one function. Consider the following example:
    CREATE FUNCTION updateMaterializedData( ) AS $$
        TRUNCATE tab1;
        TRUNCATE tab2;
        INSERT INTO tab1 (<query1>);
        INSERT INTO tab2 (<query2>);
    $$ language sql;

Some implementations apply query deduplication across the individual statements, factoring out common subqueries from <query 1> and <query2>. Some implementations determine if the queries refer to tab1 or tab2 to ensure that both queries see the tables in the correct state.

FIGS. 5A-5I provide a flowchart of a process 500 for building, optimizing, and executing a query operator tree to retrieve data from a database, according to some implementations. The process 500 is performed at a database engine having one or more computing devices, each having one or more processors and memory. The memory stores one or more programs configured for execution by the one or more processors. The one or more programs execute to retrieve data from a database (e.g., an SQL database).

The database engine 120 receives (502) a database query 226 from a client. The database engine 120 (or the query parser 240 within the database engine) parses (504) the database query 226 to build a query operator tree 228, which includes a plurality of query operators. The database engine performs (506) one or more optimization passes 308 on the query operator tree, including performing a deduplication optimization pass 308-D, to form an optimized execution plan 230.

In some implementations, the deduplication optimization pass includes creating (520) a list of query operators 318 via a first traversal 316 of the query operator tree 228, determining (524) a first query operator that is equivalent to a second query operator, based on a hash map, via a second traversal (e.g., traversal 322) of the query operator tree 228, and replacing (532), via a third traversal (e.g., traversal 328) of the query operator tree 228, the second query operator with a tree node (e.g., an EXPLICITSCAN operator) that links to the first query operator. The database engine executes (514) the optimized execution plan to retrieve a result set from the database, and returns (518) the result set to the client.

Referring to FIG. 5C, in some implementations, the database engine 120 computes (536) a list of dependencies 320 among the query operators in the list of query operators 318. The second traversal comprises a breadth-first post-order traversal (e.g., traversal 322) of the query operator tree 228 based on the list of dependencies 320 so that the query operators that do not have dependencies are visited before the query operators with dependencies. In some implementations, in accordance with a determination that a third query operator has no equivalent query operators, the database engine 120 updates (538) the list of dependencies 320 to indicate that the third query operator has dependencies. In this way, the parent of the third query operator is not selected during the breadth-first post-order traversal.

Referring to FIG. 5E, in some implementations, the database engine 120 replaces (548) the second query operator with the tree node only when the first query operator can be materialized. For example, the database engine employs the heuristic that re-computation (or re-materialization) is better than storing and retrieving a previously computed result because the concerned query operator (e.g., a join operator) produces a large result and storing and retrieving the large result would lead to memory and bandwidth related performance issues. In some implementations, the database engine replaces (550) the second query operator when the first query operator is either a GROUPBy operator, a GROUPJOIN operator, a SORT operator, a WINDOW Operator, or a TEMP operator.

Referring to FIG. 5F, the tree node (e.g., EXPLICITSCAN operator) that the database engine 120 uses to link to the first query operator reduces (552) the number of execution instances of a portion of the optimized execution plan corresponding to the second query operator, in accordance with some implementations.

Figure 5A:
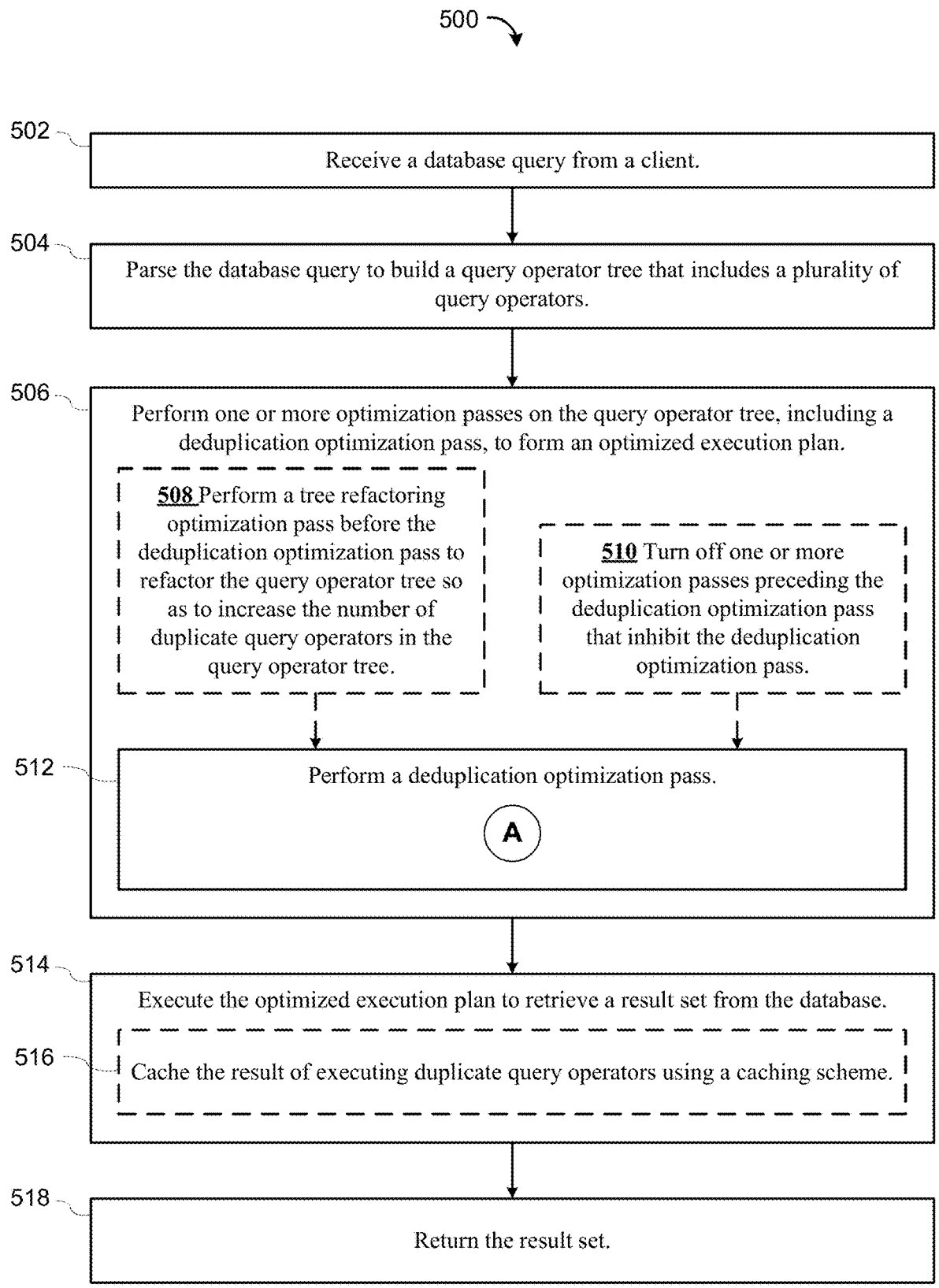
Figure 5B:
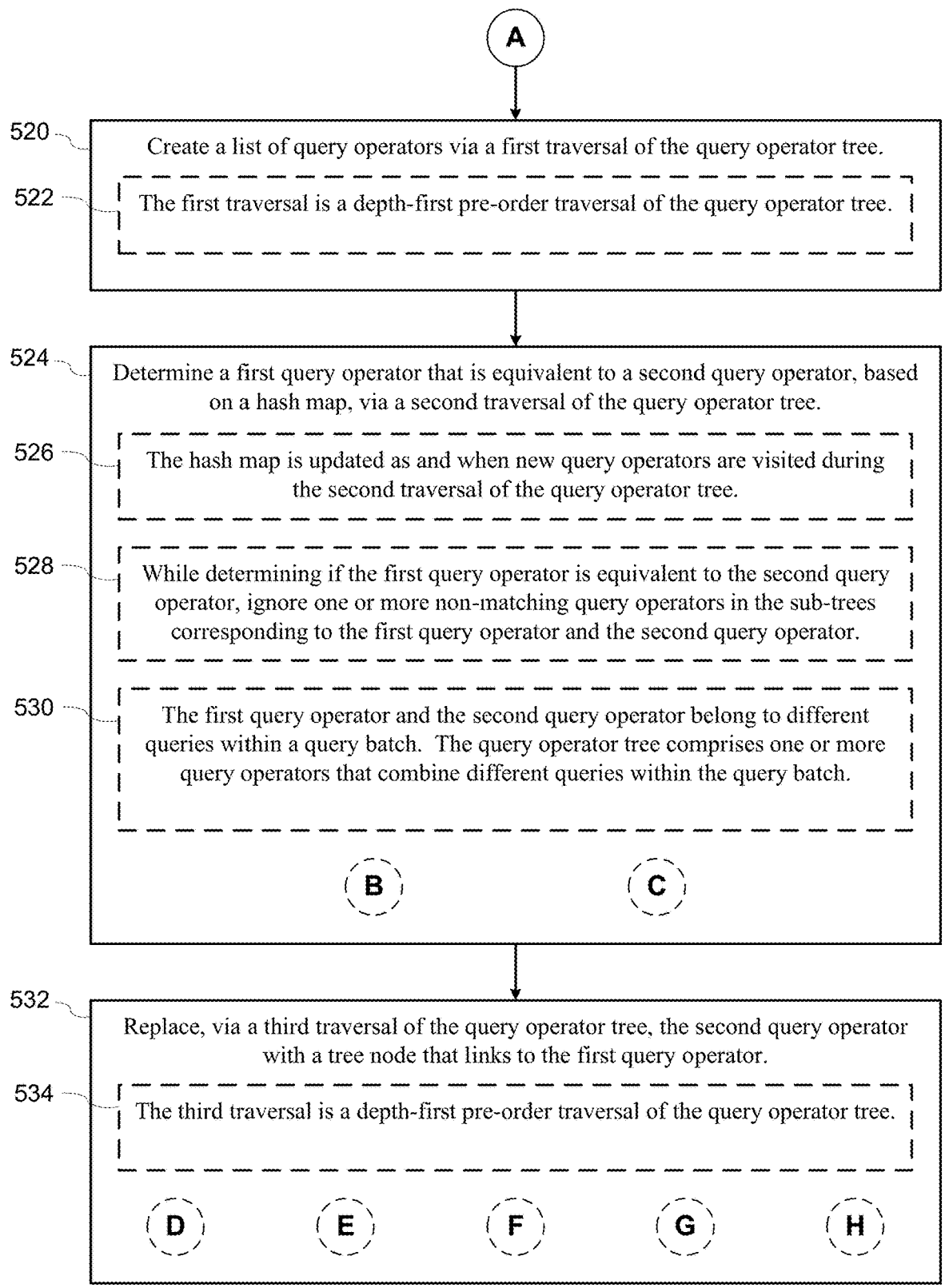

Referring now back to FIG. 5B, in some implementations, the first traversal and the third traversal of the query operator are (522, 534) depth-first pre-order traversal of the query operator tree.

Referring now back to FIG. 5A, in some implementations, the database engine 120 performs (508) a tree refactoring optimization pass before the deduplication optimization pass to refactor the query operator tree so as to increase the number of duplicate query operators in the query operator tree. In other words, the refactoring increases opportunities for the deduplication optimization pass to remove duplicate or redundant query operators. In some implementations, the database engine turns off, suppresses, or does not run (510) one or more optimization passes preceding the deduplication optimization pass that would inhibit the deduplication optimization pass (e.g., decrease the number of duplicate query operators in the query operator tree, reduce opportunities, or make finding duplicates difficult).

Referring now to FIG. 5D, in some implementations, the database engine 120 determines (524) if the first query operator is equivalent to the second query operator based on determining (540) if the respective input operators of the first query operator and the second query operator are equivalent, and/or determining (544) if the first query operator and the second query operator have equivalent properties (e.g., the operators are selection predicates, join conditions, or scanned tables). In some implementations, the database engine 120 determines (546) the first query operator to have equivalent properties as that of the second query operator based at least on information unit mapping (sometimes called IUMapping) of the input operators of the first query operator and the second query operator. In some implementations, the database engine takes into consideration (542) commutativity, associativity, and similar algebraic properties of query operators for determining whether the first query operator is equivalent to the second query operator. While doing so, the database engine ignores minor differences between the algebraic representations of the first query operator and the second query operator.

Referring now back to FIG. 5B, in some implementations, while determining if the first query operator is equivalent to the second query operator, the database engine ignores (528) one or more non-matching query operators (sometimes called "transparent" operators) in the sub-trees corresponding to the first query operator and the second query operator.

In some implementations, the hash map 324 is indexed by query operator signatures (e.g., using one of the signature compute functions). In some implementations, the hash map is updated (526) as query operators are visited during the second traversal of the query operator tree.

Figure 5G:
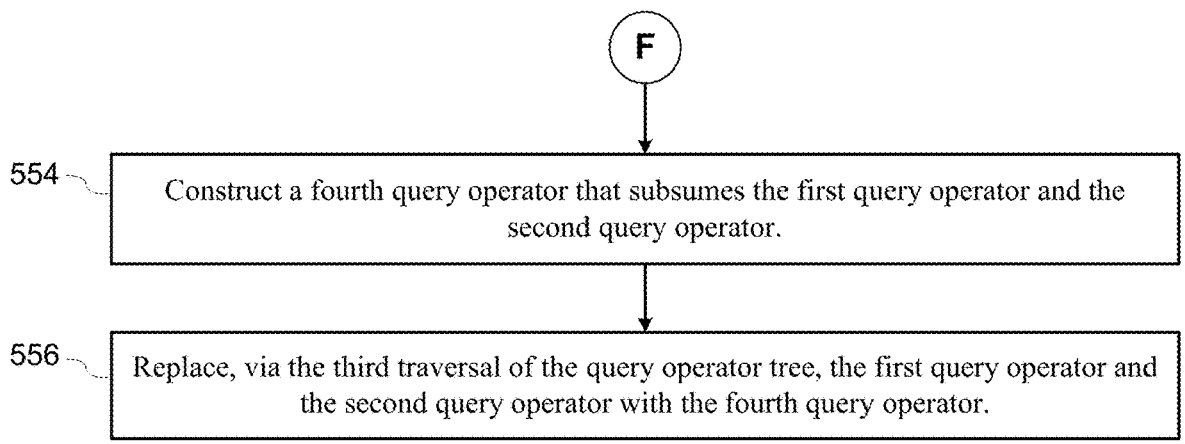

Referring next to FIG. 5G, in some implementations, the database engine 120 merges query fragments by constructing (554) a fourth query operator that subsumes the first query operator and the second query operator, and/or replacing (556), via the third traversal of the query operator tree, the first query operator and the second query operator with the fourth query operator.

Figure 5H:
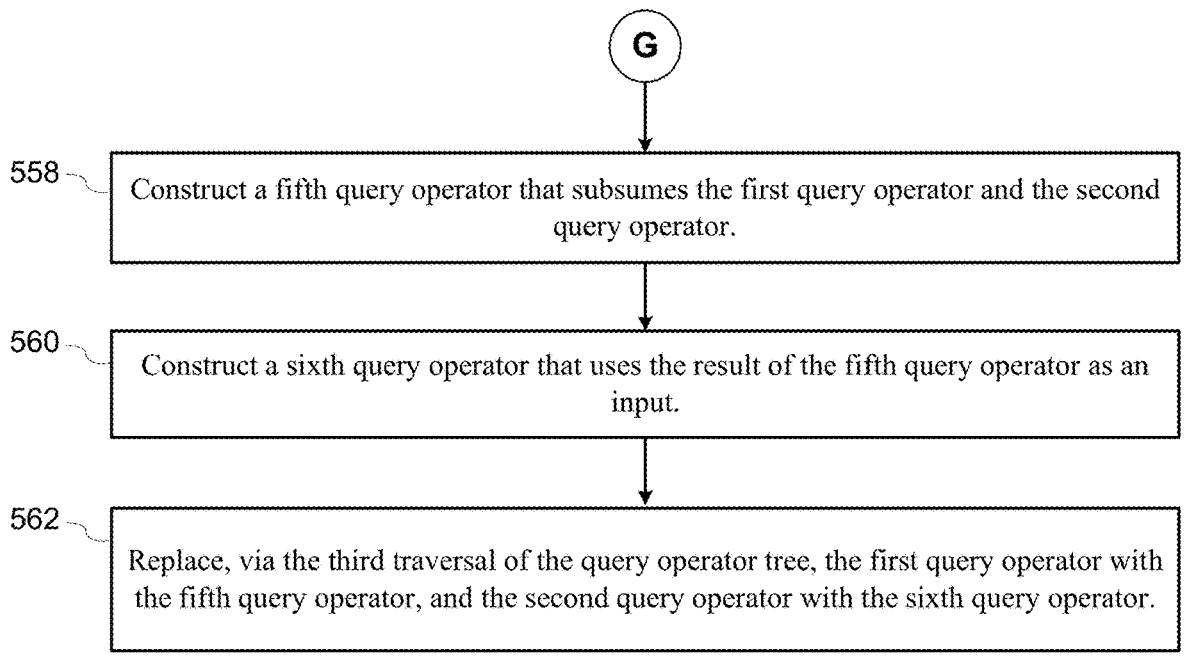

As shown in FIG. 5H, in some implementations, the database engine 120 optimizes aggregation hierarchies in query operator trees by constructing (558) a fifth query operator that subsumes the first query operator and the second query operator, constructing (560) a sixth query operator that uses the result of the fifth query operator as an input, and/or replacing (562), via the third traversal of the query operator tree, the first query operator with the fifth query operator, and the second query operator with the sixth query operator.

Figure 5I:
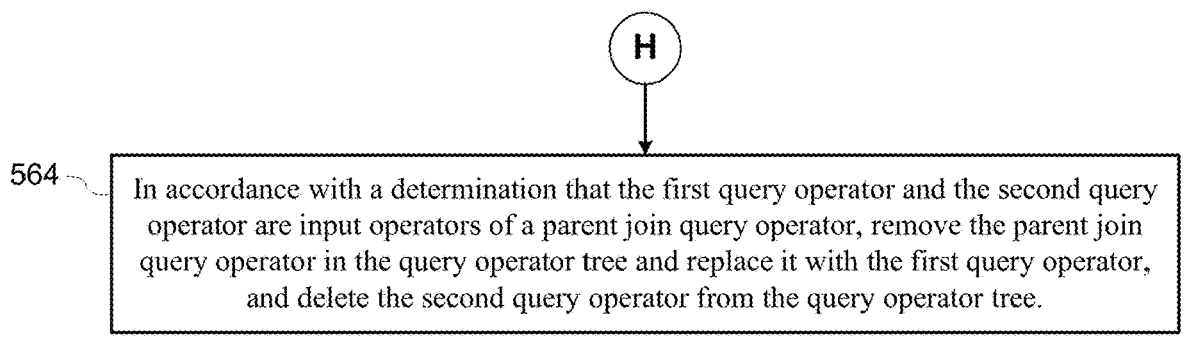

In some implementations, the database engine 120 removes redundant joins, as indicated in FIG. 5I. For example, in accordance with a determination that the first query operator and the second query operator are input operators of a parent join query operator, the database engine 120 removes (564) the parent join query operator in the query operator tree and replaces it with the first query operator, and deleting the second query operator from the query operator tree.

Referring back to FIG. 5A, in some implementations, the database engine 120 recycles and/or caches intermediate results of execution by caching (516) a first result of executing the first query operator using a caching mechanism. For example, the database engine uses a LRU or a similar scheme that maximizes cache hit rate. In some implementations, the database engine uses a persistent cache (e.g., in packed workbooks) so that future loads or first impressions are fast.

Referring to FIG. 5B, in some implementations, the database engine 120 removes (530) duplicate query operations across batch queries. The first query operator and the second query operator belong to different queries within a query batch, and the query operator tree comprises one or more query operators (e.g., a UNIONALL operator), which combine different queries within the query batch.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A database engine, comprising:
one or more computing devices, each having one or more processors and memory, wherein the memory stores one or more programs configured for execution by the one or more processors and the one or more programs comprise instructions for:
receiving a database query from a client;
parsing the database query to build a query operator tree, the query operator tree including a plurality of query operators;
performing one or more optimization passes on the query operator tree, including a deduplication optimization pass, to form an optimized execution plan, the deduplication optimization pass including:
creating a list of query operators via a first traversal of the query operator tree;
determining a first query operator that is equivalent to a second query operator, based on a hash map, via a second traversal of the query operator tree; and
substituting, via a third traversal of the query operator tree, the second query operator with a tree node that links to the first query operator;
executing the optimized execution plan to retrieve a result set from the database; and
returning the result set to the client.

2. The database engine of claim 1, further comprising computing a list of dependencies among the query operators in the list of query operators, wherein the second traversal comprises a breadth-first post-order traversal of the query operator tree based on the list of dependencies so that query operators that do not have dependencies are visited before query operators with dependencies.

3. The database engine of claim 2, further comprising:
in accordance with a determination that a third query operator has no equivalent query operators in the query operator tree, updating the list of dependencies to specify that the third query operator has dependencies so that the parent of the third query operator is not selected during the breadth-first post-order traversal.

4. The database engine of claim 1, further comprising:
substituting the second query operator with the tree node only when the first query operator can be materialized.

5. The database engine of claim 4, wherein the first query operator is one of: a GROUPBy operator, a GROUPJOIN operator, a SORT operator, a WINDOW operator, or a TEMP operator.

6. The database engine of claim 1, wherein the tree node that links to the first query operator reduces a count of execution instances of a portion of the optimized execution plan corresponding to the second query operator.

7. The database engine of claim 1, wherein the first traversal and the third traversal comprise depth-first preorder traversals of the query operator tree.

8. The database engine of claim 1, further comprising performing a tree refactoring optimization pass before the deduplication optimization pass to refactor the query operator tree so as to increase duplicate query operators in the query operator tree.

9. The database engine of claim 1, further comprising turning off one or more optimization passes preceding the deduplication optimization pass that inhibit the deduplication optimization pass.

10. The database engine of claim 1, wherein determining if the first query operator is equivalent to the second query operator comprises:
  determining if input operators of the first query operator and the second query operator are equivalent; and
  determining if the first query operator and the second query operator have equivalent properties.

11. The database engine of claim 10, wherein determining if the first query operator and the second query operator have equivalent properties uses an information unit mapping of the input operators of the first query operator and the second query operator.

12. The database engine of claim 10, wherein determining if the first query operator is equivalent to the second query operator uses commutativity and associativity rules.

13. The database engine of claim 1, wherein the hash map is updated when new query operators are visited during the second traversal of the query operator tree.

14. The database engine of claim 1, wherein determining if the first query operator is equivalent to the second query operator ignores one or more non-matching query operators in the sub-trees corresponding to the first query operator and the second query operator.

15. The database engine of claim 1, further comprising:
  constructing a fourth query operator that subsumes the first query operator and the second query operator; and
  substituting, via the third traversal of the query operator tree, the first query operator and the second query operator with the fourth query operator.

16. The database engine of claim 1, further comprising:
  constructing a fifth query operator that subsumes the first query operator and the second query operator;
  constructing a sixth query operator that uses the result of the fifth query operator as an input; and
  substituting, via the third traversal of the query operator tree, the first query operator with the fifth query operator, and the second query operator with the sixth query operator.

17. The database engine of claim 1, further comprising:
  in accordance with a determination that the first query operator and the second query operator are input operators of a parent join query operator, removing the parent join query operator in the query operator tree, replacing the parent join query operator with the first query operator, and deleting the second query operator from the query operator tree.

18. The database engine of claim 1, wherein the first query operator and the second query operator belong to different queries within a query batch, and wherein the query operator tree comprises one or more query operators that combine different queries within the query batch.

19. A non-transitory computer readable storage medium storing one or more programs configured for execution by a computer system having one or more processors and memory, the one or more programs comprising instructions for:
  receiving a database query from a client;
  parsing the database query to build a query operator tree, the query operator tree including a plurality of query operators;
  performing one or more optimization passes on the query operator tree, including a deduplication optimization pass, to form an optimized execution plan, the deduplication optimization pass including:
    creating a list of query operators via a first traversal of the query operator tree;
    determining a first query operator that is equivalent to a second query operator, based on a hash map, via a second traversal of the query operator tree; and
    substituting, via a third traversal of the query operator tree, the second query operator with a tree node that links to the first query operator;
  executing the optimized execution plan to retrieve a result set from the database; and
  returning the result set to the client.

20. A method of retrieving data from a database, comprising:
  at a computer system having one or more computing devices, each computing device having one or more processors and memory storing one or more programs configured for execution by the one or more processors:
  receiving a database query from a client;
  parsing the database query to build a query operator tree, the query operator tree including a plurality of query operators;
  performing one or more optimization passes on the query operator tree, including a deduplication optimization pass, to form an optimized execution plan, the deduplication optimization pass including:
    creating a list of query operators via a first traversal of the query operator tree;
    determining a first query operator that is equivalent to a second query operator, based on a hash map, via a second traversal of the query operator tree; and
    substituting, via a third traversal of the query operator tree, the second query operator with a tree node that links to the first query operator;
  executing the optimized execution plan to retrieve a result set from the database; and
  returning the result set to the client.

* * * * *